US012361231B2

(12) United States Patent
O'Hare

(10) Patent No.: US 12,361,231 B2
(45) Date of Patent: Jul. 15, 2025

(54) USER INTERFACE FOR COLLABORATIVE COMPUTER-AIDED LANGUAGE TRANSLATION PLATFORM

(71) Applicant: Translation Business Systems Japan, Tokyo (JP)

(72) Inventor: Paul O'Hare, Tokyo (JP)

(73) Assignee: Translation Business Systems Japan, Tokyo (JP)

( * ) Notice: Subject to any disclaimer, the term of this patent is extended or adjusted under 35 U.S.C. 154(b) by 96 days.

(21) Appl. No.: 18/496,744

(22) Filed: Oct. 27, 2023

(65) Prior Publication Data
US 2024/0143948 A1    May 2, 2024

Related U.S. Application Data

(60) Provisional application No. 63/421,073, filed on Oct. 31, 2022.

(51) Int. Cl.
*G06F 40/58* (2020.01)
*G06F 40/166* (2020.01)
*G06F 3/0482* (2013.01)

(52) U.S. Cl.
CPC ............ *G06F 40/58* (2020.01); *G06F 40/166* (2020.01); *G06F 3/0482* (2013.01)

(58) Field of Classification Search
CPC ...................................................... G06F 40/58
See application file for complete search history.

(56) References Cited

U.S. PATENT DOCUMENTS

2019/0065482 A1\* 2/2019 Nozue .................. G06F 17/289

\* cited by examiner

*Primary Examiner* — James J Debrow
(74) *Attorney, Agent, or Firm* — Brownstein Hyatt Farber Schreck, LLP

(57) ABSTRACT

A system for aiding translation from a first language to a second language includes a frontend and a backend. An input document can be subdivided into segments, which in turn can be fragmented into document fragments. A document fragment, selected by a translator, can be further edited by that translator into sub-fragments which in turn can be provided as input to one or more suggestion engines. Output from the suggestion engines includes prior human translations of the sub-fragment, machine translations of the sub-fragment, and/or hybrid combinations thereof.

20 Claims, 14 Drawing Sheets

USER INTERFACE FOR COLLABORATIVE COMPUTER-AIDED LANGUAGE TRANSLATION PLATFORM

CROSS-REFERENCE TO RELATED APPLICATION

This application is a nonprovisional of, and claims the benefit under 35 U.S.C. 119(e) to U.S. Provisional Patent Application No. 63/421,073, filed Oct. 31, 2022, and entitled "User Interface for Collaborative Computer-Aided Language Translation Platform," the contents of which are incorporated herein by reference as if fully disclosed herein.

TECHNICAL FIELD

Embodiments described herein relate to cloud-based computer-aided language translation platforms and, in particular, to frontend user interfaces for collaborative computer-aided language translation systems and platforms.

BACKGROUND

Computer-aided translation software ("CAT") assists multilingual human translators in accurately translating documents from one language to another. Conventional CAT software renders a graphical user interface for a human translator that suggests, to the human translator, one or more machine-translated versions of words, phrases, clauses, sentences, or other parts extracted from a working portion of a document undergoing translation. Providing convenient machine-translation suggestions to human translators was conventionally thought to accelerate translation of documents between languages.

In many cases, however, machine-translated suggestions are literal, informal, grammatically incorrect, incomplete, contextually inaccurate, or otherwise not useful. As a result, suggestions provided by conventional CAT software, independent of which machine-translation engine(s) is/are used, are often entirely ignored by human translators.

Furthermore, a significant majority of commercially-available general purpose machine-translation engines are trained on informal corpuses, and do not generate translation suggestions suitable for idiomatic writing, legal documents, scientific writing, medical or pharmaceutical writing, or other important writing for which accurate and precise translation is required. As a result, obtaining accurate human translation of important writing from one language to another is a time-consuming and expensive undertaking, requiring highly-skilled human translators; conventional computer-aided translation software does not significantly impact either the time or cost of human translation.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
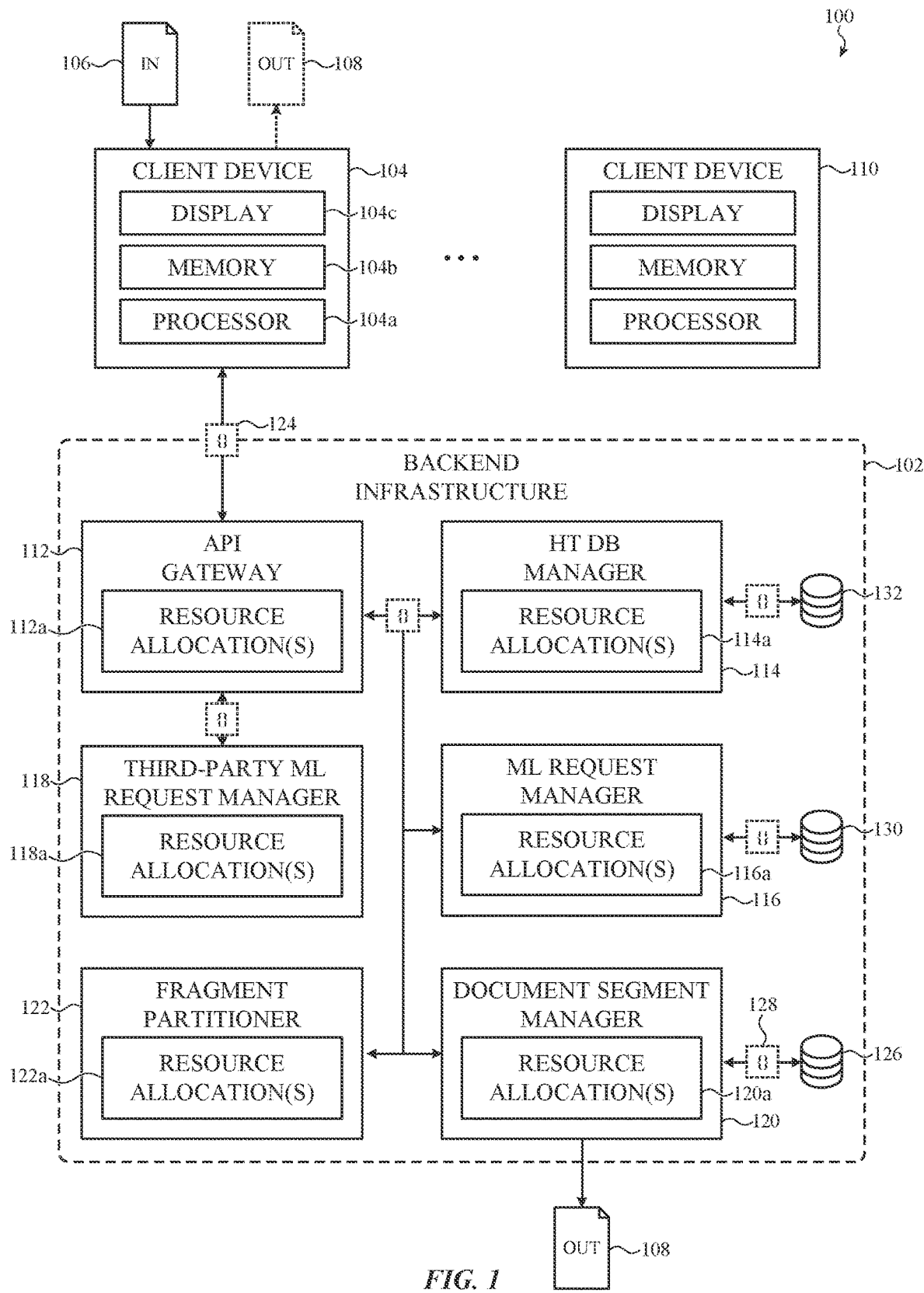
FIG. 1 depicts a computer-aided translation platform, as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to computer-aided translation software tools, conventionally abbreviated as "CAT" systems or platforms. A CAT system as described herein may be implemented over cloud or otherwise remote (and/or geographically distributed) infrastructure and may operate by cooperation of multiple communicably-intercoupled instances of software.

Specifically, a host server can instantiate an instance of backend software and a client device can instantiate an instance of frontend software. The host server and client device can be communicably coupled over a network connection, which may include the open Internet. Coupling of the host server and client device facilitates exchange of structure data between the frontend instance and the backend instance. The frontend instance is configured to render, on a display of the client device, a graphical user interface.

The graphical user interface can render various affordances, depict one or more suggestions and, more generally, present information to, and receive input from, a user of the client device.

In particular, a multilingual human translator tasked with translating content from a first (written) language to a second (written) language can use the frontend to efficiently complete translation work by engaging with the one or more affordances and/or by selecting one or more of the suggestions presented in the graphical user interface. If a selected suggestion is not entirely contextually accurate or grammatically correct, a human translator may edit the selected suggestion to finalize the translation of the content from the first language to the second language. In this manner, near-accurate and/or grammatically incorrect translation suggestions may nevertheless be useful to a human translator. More generally, it may be appreciated that translation work can be completed more expeditiously by a human translator by selecting accurate, or near-accurate, translation suggestions (e.g., of phrases, sentences, and so on) and appropriately editing the same, as compared to a translator manually typing each and every term and phrase of a final translation.

As may be appreciated, the more useful that suggestions presented in a graphical user interface are, the more quickly a document may be translated by a skilled, multilingual, human translator; effort of the translator shifts from a data entry/typing task to a multilingual comprehension and UI element selection task. In this way, multilingual translators who are not also fast multilingual typists may nevertheless complete translation work quickly. This may be especially true in circumstances in which keyboard layouts for a particular language pair are significantly different.

In view of the foregoing, more generally, many embodiments described herein relate to systems and methods for generating and presenting highly useful translation suggestions to human translators in a graphical user interface.

For example, a system as described herein can be configured to provide suggestions, to a human translator, to reduce the time required to translate sentences or other document segments from one language to another. The suggestions may be based on machine translations, prior human translations, and/or combinations thereof, referred to herein as "hybrid" suggestions. As suggestions provided herein may, in many embodiments, be based on work of other translators, a system as described herein may be leveraged as a collaboration tool by a team of translators.

For simplicity of description, a human translator may be referred to herein as a "translator" of a document or other content, or in other contexts, as a "user" of a frontend of a system as described herein.

As noted above, a translator can leverage a graphical user interface of a system as described herein to translate an input document presented in a first language (a "source language") to an output document presented in a second language (a "target language"). The source document may be the property of a "translation services client," which may be an institution, corporation, entity, or individual. In addition, for simplicity, an input document may be referred to herein as an "original" document or a "source" document and an output document may be referred to as a "translated" document. As a document is translated by a translator, an interim or incomplete version of an output document may be referred to as a "working document."

To assist a translator, a source document may be automatically subdivided into "sections" or other logical or grammatical subdivisions (e.g., headings, paragraphs, chapters, and so on), which in turn may be automatically segmented into sentences or clauses, referred to herein as "fragments" or "translatable strings."

Further, although the term "document" is used herein to describe content undergoing translation, it may be appreciated that a physical or digital document is merely one example of content that may be translated with the assistance or aid of a system as described herein. For example, a system (and/or methods of operating the same) as described herein may be used to translate multimedia content (e.g., multilanguage closed captioning, lyrics, and so on), real-time or near real-time live content, and so on. Many forms of translatable content are possible.

Accordingly, in view of the foregoing definitions, a frontend of a system or platform as described herein may be used, by a translator, to convert an original document in a source language to a translated document in a target language. The system may automatically segment a source document into suitably-sized fragments so as to discretize translation tasks for the translator. Phrased in another manner, embodiments described herein can automatically segment document-scale translation work into discrete sentence-scale or phrase-scale translation work.

For each document fragment shown to a translator, a machine translation of that fragment—if available—may be shown as a suggestion to the translator. If the translator selects a machine translation suggestion, the machine-translated text may be automatically copied into an editable field for the translator for further editing (if necessary) or other refinement by the translator. In this manner, sequential and/or automatic machine translation of document fragments can assist a human translator to expedite document-scale translation work.

Some embodiments described herein can be configured to leverage multiple machine translation engines, aggregating and deduplicating results therefrom. As used herein the term "engine" refers to a trained machine learning system (or generative system) configured to receive text in a first language as input and to provide output in a second language different from the first language. In some cases, an engine can be configured for translating in a single direction (e.g., from a first language to a second language, but not the reverse). In other cases, an engine can be configured for translating in either direction for a particular language pair. In yet other examples, an engine can be configured for translating by and between multiple languages. For simplicity, many embodiments that follow reference an engine configured to translate bidirectionally, but it is appreciated that this is merely one example and that many engines are configured only for unidirectional translation.

A system as described herein may be communicably coupled to two or more API endpoints, each associated with a different machine translation engine and/or a differently-trained machine translation engine. For example, a document fragment automatically extracted from an original document can be provided as input to multiple machine translation engine API endpoints. Each respective machine translation engine receives the document fragment as input and provides one or more translations (into a specified target language) of the input phrase. In some cases, each machine translation engine can be configured to provide output that includes a confidence score that may be used to sort, order, and/or rank translations received from multiple engines.

As may be appreciated, a system as described herein can communicate with a machine translation engine over any suitable protocol which may vary from API to API. In some cases, a RESTful API may be implemented by a machine translation engine; the API may be configured to receive as input a JSON-formatted object from the system (either the backend or the frontend) that includes an attribute identifying a source language, a target language, and a string to translate.

For example, such an object may be structured as shown below:

```
{
  "source_language" : "English",
  "target_language" : "Japanese",
  "string_to_translate" : "[English language string of text]"
}
```

In response to receiving, as input, the example preceding a JSON-formatted object, a machine translation engine or, in particular, an API gateway associated with and metering access to a machine translation engine can be configured to execute one or more operations to cause the "[English language string of text]" to be translated into Japanese, which is identified by country code as the target language.

In some embodiments, this example machine translation engine can return a respective JSON-formatted object to the system that includes attributes such as the source language, the target language, the original string, the translated string, and one or more confidence scores.

For example, such an object may be structured as shown below:

```
{
   "source_language" : "English",
   "target_language" : "Japanese",
   "string_to_translate" : "[English language string of text]",
   "translations" :[
      {
         "value" : "[First Japanese language string of text]",
         "confidence" : 0.84,
         "engine" : "English-JPv1.4"
      },
      {
         "value" : "[Second Japanese language string of text]",
         "confidence" : 0.67,
         "engine" : "English-JPv1.2"
      }
   ]
}
```

In response to receiving a JSON-formatted response from the machine translation engine, a system as described herein may be configured to parse results therefrom. In this example, two translation suggestions of varying confidence are provided. In addition, in this example, the two translation suggestions may be provided by two separate versions of language-pair-specific versions of the machine translation engine. In many embodiments, a system as described herein can be configured to filter such results by comparing confidence values against a threshold, which may vary from embodiment to embodiment. For example, a confidence threshold value may be set at 0.80, which may result in rejecting the second suggestion having only 0.67 confidence.

In some cases, different machine translation engines may be selected for different translation services clients, different document types, or by translators. For example, medical writing may be translated by a machine translation engine trained on medical writing. Similarly, legal writing may be trained by a machine translation engine trained on legal writing. In yet other examples, a particular translation services client (e.g., an international law firm) may provide a client-specific corpus against which a machine translation engine may be trained. In this example, the trained machine translation engine is client-specific and private, ensuring that suggestions provided by the engine do not unintentionally disclose confidential client-specific matter.

In these embodiments, as noted above, results and suggestions from one or more machine translation engines can be aggregated together and ordered by confidence. In some cases, confidence values reported by a particular machine translation engine may be biased by an engine-specific scalar value and/or may be provided as input to a conferencing algorithm or formula so as to normalize confidence values across multiple machine translation engines.

In some cases, biasing of confidence values (and/or ordering of suggestions presented in a graphical user interfaces) can be based at least in part on user interaction history. More specifically, the more frequently translators select a translation suggestion provided by a specific machine translation engine, the more prominently that engine's future suggestions may be presented to future translators.

In many examples, biasing of a particular engine's confidence values may be based on a particular language pair and/or translation direction. For example, a first engine may provide more accurate results when translating from English to Japanese than when translating from Japanese to English. The same engine may not provide accurate translations from Arabic to Spanish at all. In these examples, a single translation engine may have multiple confidence biases which, in turn, can cause a system as described herein to order results obtained from that engine differently depending upon context of a particular translation task.

For simplicity, machine translation engines—which are conventionally implemented as trained machine learning models—described herein are referred to as "ML" CAT tools, and translations provided thereby may be referred to as "ML" translation suggestions.

Although ML suggestions can expedite translation work in some circumstances, as noted above, in many cases, ML translation suggestions may be too literal, informal, grammatically incorrect, incomplete, contextually inaccurate, or otherwise not useful to a human translator. This may be especially true for difficult-to-translate phrases or sentences, such as those including language-specific idioms or terms of art, proper names, document-specific defined terms, grammatical complexity, and so on.

Further, ML suggestions often exhibit diminishing usefulness as sentence or phrase length increases. For example, a well-trained ML engine may be able to successfully translate a sentence of language-specific average length, but may produce useless results for a run-on sentence or a multi-clause sentence, such as a sentence including a long list of elements. Such sentences may be prevalent in particular document types, such as contracts, other legal documents, academic writing, medical writing, and so on.

Further still, in many embodiments and as noted above, ML suggestions that do not satisfy a threshold confidence score may be discarded or otherwise not shown to a translator. This architecture may beneficially prevent a significant majority of poor-quality ML suggestions from being shown to a translator, but may also cause a system as described herein to only rarely display an ML suggestion.

To account for these and other drawbacks of ML suggestions, a system as described herein also provides a translator with suggestions derived from prior translations made by a prior human translator when translating similar phrases, sentences, or sentence fragments. In particular, as with ML suggestions described above, for each sentence or sentence fragment shown to a translator, a human translation—if available—may be shown as a suggestion to the translator. The human translation may be obtained from a database of prior translations of identical, or linguistically or statistically similar, phrases to the sentence or sentence fragment undergoing translation.

For example, a document fragment may be provided as input to a translation database manager configured to query a database of prior translations (which may be translation services client-agnostic or translation services client-specific; in many embodiments, such databases or tables or searchable rows therein may be particular to a specific translation services client) to determine whether the particular document fragment has been previously translated. If an identical match is found, the match (provided in the target language) may be shown to the human translator as a human translation suggestion.

In other cases, an exact match may not be found. In such examples, the translation database manager may be configured to determine whether near matches exist in the translation database. In these examples, the translation database manager may be configured to semantically and/or textually compare the input string to strings stored in the database. As one example, the prior translation database manager may be configured to determine a Levenshtein distance, cosine distance, or other textual difference between entries in the database and the input string. A match may be determined by a calculated similarity satisfying a threshold similarity (e.g., a Levenshtein distance below a minimum distance). In other cases, word or phrase vectorization/embeddings may be leveraged to identify previously-translated document fragments with similar meaning.

As with other embodiments described herein, a system as described herein can communicate with a translation database manager over any suitable protocol. In some cases, a RESTful API may be implemented by a translation database manager. As with other described examples, the API may be configured to receive as input a JSON-formatted object from the system (either the backend or the frontend) that includes an attribute identifying a source language, a target language, and a string to compare to prior database entries recorded in one or more databases.

Optionally, the JSON-formatted object may also include a client identifier to ensure that queries of any database only return results associated with the particular translation services client. In this manner, cross-recommendation between different clients may be prevented.

For example, such an object may be structured as shown below:

```
{
  "source_language" : "English",
  "target_language" : "Japanese",
  "string_to_search" : "[English language string of text]",
  "client_uuid" : "5f0c9d68-3902-11ed-a261-0242ac120002"
}
```

In response to receiving, as input, the example preceding JSON-formatted object, a translation database manager or, in particular, an API gateway can be configured to execute one or more operations to cause the "[English language string of text]" to be translated into Japanese which, as with other examples provided herein, is identified by country code as the target language. A country abbreviation is merely one example; target and source languages can be identified in any suitable manner. In some cases, databases may only be configured for querying of a single language pair in a particular direction. In such embodiments, specifying input and output languages may not be required.

In some embodiments, this example translation database manager can return a respective JSON-formatted object to the system that includes attributes such as the source language, the target language, the original string, (optionally) the client identifier, the translated string, and one or more similarity scores.

For example, such an object may be structured as shown below:

```
{
  "source_language" : "English",
  "target_language" : "Japanese",
  "string_to_search" : "[English language string of text]",
  "translations" :[
    {
      "value" : "[Japanese language string from prior English-Japanese translation]",
```

-continued

```
      "similarity" : 0.92,
      "document id" : 10345123
    },
    {
      "value" : "[Japanese language string from prior Japanese-English translation]",
      "similarity" : 0.85,
      "document id" : 23548769
    }
  ]
}
```

In response to receiving a JSON-formatted response from the translation database manager, a system as described herein may be configured to parse results therefrom. In this example, two translation suggestions of varying similarity to the input document fragment are provided. In addition, in this example, the two translation suggestions may be provided, one from a first prior translated document (identified by a document identifier, should the translator desire to access that prior translated document) and a second from a second translated document (also identified by a document identifier). In this example, the second document may have been translated in the opposite direction from the requested input.

As with other described embodiments, a system as described herein can be configured to filter results by comparing similarity values against a threshold, which may vary from embodiment to embodiment.

A person of skill in the art may appreciate that the foregoing examples of querying a database for a match or a near match are not exhaustive; a number of string comparisons, natural language processing tasks, semantic processing tasks, and so on may be used to identify previously translated strings exhibiting similarity to a document fragment, such as described herein.

For example, as noted above, a translation database manager may be configured to search both "sides" of prior translations to obtain human translation suggestions. For example, a prior human translator may have translated a phrase from language A to language B, whereas a current human translator may be tasked with translating the same phrase from language B to language A. In this example, the translation database manager may be configured to search both previous input language strings as well as previous output language strings to identify potential matches to display to a translator.

In certain further embodiments, a translation database manager may be configured to identify (e.g., by leveraging a graph data structure, as one example) translation chains that may be followed in order to generate useful human translation suggestions. For example, a first translator may have translated a phrase from language A to language C, and a second translator may have translated the same phrase and/or a semantically, statistically, or linguistically similar phrase from language C to language B. A third translator may be tasked with translating the same phrase from language A to language B. In this example, the translation database manager may be able to determine a translation chain can be formed between the translation work of the first translator and the second translator to provide a suggestion to the third translator. A person of skill in the art may readily appreciate that chain translation in the manner described may include more than only two steps; any suitable linkages between prior translations may be used to generate human translation suggestions as described herein.

In some cases, entries in human translation databases may be provided as input to an ML engine as described above to generate one or more hybrid suggestions to a translator ("hybrid", in this context, referring to a combination of human translation and ML translation). For example, a prior translation of a phrase from language A to language B may exist in a human translation database, whereas a current translation task may require translation from language A to language C. In this example, an ML engine may be used to translate the prior human translation database entry in language A into language C in addition to translating the output entry in language B into language C. Whichever translation (A-C or B-C) exhibits a higher confidence score from the ML engine may be provided as a suggestion to the translator.

As may be appreciated, in many examples, ML translation may exhibit different accuracy or precision for different language pairs; the more similar two languages are, the higher quality translation may be achieved with ML tools. Continuing the previous example, an ML suggestion may be more accurate when translating from language B to language C than when translating from language A to language C if language B and language C are more linguistically or etymologically similar.

As a specific example, a translator may be tasked to translate a document fragment from English to Japanese. As noted above, an ML engine may be used to provide one or more suggestions to the translator based on a machine translation of the document fragment from English to Japanese. In this example, a human translation database may not contain any entry translating the document fragment from English to Japanese. However, the database may contain an entry translating the document fragment from English to Korean. As may be known to a person of skill in the art, machine translation from Korean to Japanese may be more precise and/or accurate than machine translation by and between English and Japanese. As such, in this example, a system as described herein may access the human translation database to retrieve the prior Korean translation which, in turn, can be provided as input to a machine translation engine. Output from the engine, translating the retrieved Korean phrase to Japanese, may be provided to the translator as a suggestion of a translation of the original English language document fragment.

In any case, as with ML suggestions described above, identified human translation suggestions and/or hybrid suggestions may be presented in a graphical user interface to a human translator. In many cases, as with ML suggestions, human translation suggestions and hybrid translation suggestions may be ordered by quality according to an appropriate metric, such as similarity scores or confidence scores.

In some embodiments, ML suggestions and hybrid suggestions may be presented together, separate from human translation suggestions. In other cases, ML suggestions, hybrid suggestions, and human translation suggestions may be presented together in a single list. In yet other embodiments, each suggestion type may be presented in a different list and/or in a different, dedicated region of a graphical user interface.

As with other embodiments described herein, if a translator selects a human translation suggestion or a hybrid translation suggestion, the selected suggestion text may be automatically copied into an editable field for the translator for further editing or other refinement. In this manner, prior human translation of discrete phrases can assist a human translator to expedite document-scale translation work.

For simplicity, human translation database managers described herein are referred to as "HT" database managers, and human translations provided as output thereby may be referred to as "HT" suggestions. Furthermore, as described above, suggestions generated by combining operations of HT databases and ML engines, may be referred to as "hybrid" suggestions.

In view of the foregoing, generally and broadly, it may be appreciated that a system as described herein can improve document-level translation efficiency by providing ML suggestions, HT suggestions, and/or hybrid suggestions to a human translator.

However, in some commonly-occurring circumstances, automatically generated document fragments extracted from a source document may not result in any available suggestions to provide to a translator. As noted above, this may be particularly true for certain document types, such as legal documents or medical documents, that often contain long sentences with multiple clauses.

To account for circumstances in which automated suggestion operations yield insufficient (e.g., poor grammar or word choice, literal translation where not appropriate, non-idiomatic translation, literal translation of idiomatic input text, and so on) or no results, a system as described herein can present in a graphical user interface an unrestricted input text manipulation region that enables a human translator to modify the form, format, punctuation, or phrasing of source text so that accuracy and/or precision of ML suggestions, HT suggestions, and/or hybrid suggestions can be dramatically increased.

Phrased in another manner, affording a human translator with an option to manipulate source text dramatically improves translation efficiency by shifting highly-complex long-sentence translation work from a repeating blank page/cold start problem (e.g., receiving no suggestions, requiring manual typing of a lengthy, contextually correct, translation) to a repetitive option selection and copy/editing problem. More specifically, the translator may be able to use the unrestricted input text manipulation region to further subdivide an automatically-generated document fragment into smaller logical or grammatical parts, which in turn can be automatically processed by the system to generate ML suggestions, HT suggestions, and/or hybrid suggestions.

For example, a translator using a system as described herein may replace an idiomatic phrase or colloquial term with a phrase or term of equivalent meaning that is more likely to be correctly translated by an ML engine and/or is more likely to appear in a human translation database. In this example, modifying the source text in a minimal manner, thereafter indicating to the user interface to re-translate and/or re-parse the modified source text (in some cases, retranslation of modified source text can be performed automatically and/or on an interval), and thereafter copying (or selecting) an ML suggestion corresponding to at least a portion of the modified input text may be significantly more time efficient than manually typing a translation when no suggestions are offered by the system. In some cases, no selection of suggestions may be required; a top suggestion can be automatically added to a working portion of the graphical user interface.

In another example, a translator using a system as described herein may correct typographical errors present in a source text that may cause ML engines and/or human translation matching to fail.

In another example, a translator using a system as described herein can insert one or more newline characters to cause the system to parse each individual line as a unique document fragment. For example, a multi-clause list in a legal document may be subdivided into multiple lines by the human translator. Thereafter, the system can regard each line as a discrete document fragment to provide as input to an ML engine and/or to an HT database manager. In these examples, shorter document fragments may elicit more accurate suggestions than the longer, unbroken, (automatically-generated) document fragment.

In yet another example, a translator using a system as described herein may mark phrases or terms that should not be translated, such as terms of art, proper names, party names, and so on. Once such terms are marked, ML suggestions and/or HT suggestions may be more useful to a translator, needing less editing. For example, an untagged proper name or defined term in a document fragment may be literally translated (e.g., a fragment "Mark Green agrees to contract terms with Company" may be incorrectly translated), thereby requiring more editing work of a translator. By tagging proper names, a translator can prevent such problems.

In some cases, document-specific lists of proper names and/or defined terms can be maintained so that a translator need only tag a particular proper name or defined term once. Thereafter, the system may automatically tag, for the translator, subsequent occurrences of the same term or phrase. In some cases, a client-specific and/or multi-client database may record terms of art for particular languages or document types, which may be used in subsequent translation tasks to automatically tag certain terms or phrases as "not for translation."

More generally and broadly, in view of the foregoing, it may be appreciated that embodiments described herein relate to user interfaces and frontends of systems that include affordances, layouts, and/or features useful to highly-skilled human translators, thereby reducing the time and cost of translating documents from one language to another.

As noted above, a system as described herein includes a frontend and a backend configured to communicably couple over a computing network, which may include the open Internet, to exchange computer-readable structured data (e.g., JSON format, XML format, or any other suitable form or format). The structured data can be received from the backend by the frontend to inform rendering of a graphical user interface on a display of a client device operated by a human translator to assist with translation of a document (or more generally any content) from one language to another.

To facilitate an efficient translation effort by the translator, a system may be configured, as an optional preprocessing step, to convert a source document into a uniform structured format, which can thereafter be automatically subdivided into document fragments such as described above.

For example, in some cases, an input document may be in Portable Document Format™ (PDF) format, which may be rasterized or may include a raw text layer. In such examples, a system as described herein may be configured, as an optional initial preprocessing step, to perform optical character recognition and requisite image processing steps (e.g., de-skew, binarization, noise removal, and so on) in order to obtain computer-readable text therefrom. In some cases, as known to a person of skill in the art, OCR operations may not be required if a text layer is present and/or if a vector PDF is provided as input; text layers may be trivially extracted to retrieve computer-readable text from a vectorized PDF document.

A PDF input document is merely one example. A person of skill in the art appreciates that any suitable document format may be provided as input including proprietary or open document formats from which strings of computer-readable text may be extracted and/or parsed into corresponding parts or sections of a uniform structured format.

A uniform structured format version of an input document, as described herein, may vary from embodiment to embodiment. Example uniform structured formats include, but are not limited to an XML-based format, a YAML-based format, a markdown-based format, a JSON-based format, and so on.

In some examples, content of a uniform document format may be subdivided into paragraphs or other document sections by splitting strings at each newline character, return character, and/or other whitespace character or character pattern matching a particular regular expression. A person of skill in the art will readily appreciate that any suitable delimiter or regular expression may be used to subdivide a string of text into parts that may, thereafter, be parsed into corresponding parts or sections of a uniform structured format as described herein.

For simplicity of description, embodiments described herein reference JSON as an example uniform structured format into which an input document may be converted, but it may be appreciated that this is merely one example and other formats are possible; both proprietary and open document format standards may be used.

Once an input document as described herein is parsed into a uniform structured format, the content of that converted document may be automatically segmented into logical parts, which may be referred to herein as source document "sections." Section delimiters may vary from source language to source language, document to document, author to author, or embodiment to embodiment.

In one example, format identifiers may be extracted from an original source document so as to identify section headers input by an author of that source document. Thereafter, content below each identified section header and preceding a subsequent section header or document end can be tagged as falling within a particular authored section of the input document.

In addition to subdividing a converted source document into authored sections (i.e., sections that an author of the document defined), embodiments described herein can further subdivide the document into logical sections or grammatical sections. For example, a system as described herein may be configured to extract paragraphs from individual sections by splitting section strings by newline characters.

Each paragraph in turn can be subdivided into individual sentences. Thereafter, each sentence of each paragraph of each section (each "document fragment") of a particular document can be presented to a translator for translation thereof. As each document fragment of a source document is shown to a translator, it may also be provided in parallel as input to an ML engine to retrieve ML suggestions and/or as input to an HT database manager to retrieve one or more HT suggestions or hybrid suggestions. Each retrieved suggestion can be provided as a suggestion to the translator, such as noted above. If the translator is dissatisfied with provided suggestions (and/or absence thereof), the translator can modify the document fragment within the unrestricted input text manipulation region. For example, the translator may change one or more words, punctuation, and/or may insert line breaks. In such circumstances, the system may be configured to regard each new line as a separate document fragment; such smaller document fragments can thereafter be provided in parallel as input to an ML engine to retrieve ML suggestions and/or as input to an HT database manager to retrieve one or more HT suggestions or hybrid suggestions. Each retrieved suggestion can be provided as a suggestion to the translator, such as noted above.

These foregoing and other embodiments are discussed below with reference to FIGS. 1-6. However, those skilled in the art will readily appreciate that the detailed description given herein with respect to these figures is for explanation only and should not be construed as limiting.

FIG. 1 depicts a computer-aided translation platform, as described herein. The system 100 operates by cooperation of communicably intercoupled computing defines. In particular, a backend infrastructure 102 is configured to communicate over a computing network with one or more computing devices that can be used by a user of the system 100, such as a client device 104.

The client device 104 can be any suitable electronic device, whether portable or stationary. Example electronic devices include laptop devices, cellular phone devices, desktop computing devices, and the like.

The client device 104 can include a housing enclosing operational components thereof, such as a processor 104*a*, a memory 104*b*, and a display 104*c*. The processor 104*a* can be operably intercoupled with the memory 104*b* and the display 104*c*.

More specifically, the memory 104*b* can be configured to store in a nonvolatile memory at least one executable asset, such as a compile binary or executable instructions. The executable asset can be accessed by the processor 104*a* in order to instantiate an instance of software referred to as a client application or as a frontend of the system 100.

In another phrasing, the processor 104*a* of the client device 104 can cooperate with the memory 104*b* to access an executable asset from the memory 104*b* in order to at least partially instantiate an instance of software that can implement one or more features of a frontend such as described herein.

The client application can be a native application in some embodiments. In other words, the client application may be instantiated over resources made accessible by an operating system instantiated over the processing and memory resources of the client device 104. In other cases, the client application may be a browser application configured to couple to a remote server in order to receive one or more HTML-formatted documents from the remote server that, in turn, can be rendered by a browser engine. The browser engine can include an executable script engine (e.g., JavaScript™), a style calculating engine (e.g., cascading style sheets), and a layout engine (e.g., HTML rendering engine).

A person of skill in the art may readily appreciate that a client application as described herein can be configured to operate in a number of suitable ways.

The client application instantiated over physical resources of the client device 104 (e.g., the processor 104*a*, the memory 104*b*, as examples) can be configured to render a graphical user interface with the display 104*c*. The graphical user interface can include one or more sections or user interface elements which may be configured to receive information from a user of the client device 104 and/or may provide information to the user.

In many cases, such as noted above, the graphical user interface of the client application executing on the client device 104 can present one or more suggestions to a human translator user of the client application. Such suggestions can include HT suggestions, hybrid suggestions, and/or ML suggestions.

The client application can also be configured to communicably couple to one or more API endpoints defined by one or more servers or services of the backend infrastructure 102. For example, the backend infrastructure 102 can be configured to communicate with the client application over TCP or UDP or another suitable protocol. In some cases, the backend infrastructure 102 and the client application may be configured to exchange information over HTTP connections, or another suitable networking protocol. In many embodiments, the backend infrastructure 102 and the client application are configured to communicate in a secure, encrypted manner, such as over a protocol such as HTTPS. In many cases, the backend infrastructure 102 and the client application are configured to exchange structured information, such as JSON objects. A person of skill in the art may appreciate, however, that any suitable client-server relationship can be defined by cooperation of the backend infrastructure 102 and the client application.

The client application can also be configured to receive, as input, one or more documents, such as the document 106. The document 106 may be a document for which translation is required.

As noted above, an input document such as the document 106 can be provided in any suitable form or format. In some cases, an input document may require preprocessing and/or conversion into a uniform document format. Such preprocessing steps, such as OCR and/or segmentation or fragmentation, can occur on the client device 104 (e.g., by the client application) or may be performed by another portion of the system 100. For example, in some embodiments, the client device 104 and in particular the client application may pass the document 106 directly to the backend infrastructure 102 without manipulation by the client application.

In other embodiments, the document 106 may be provided as input to the backend infrastructure 102 through a suitable API endpoint. It may be appreciated that the depicted architecture in which the document 106 is received at the client application is merely one example construction.

As with other embodiments described herein, once a document such as the document 106 has been received by the system 100, it may be converted to a uniform document format and fragmented into parts. These document fragments may thereafter be shown to a user of the client device 104 iteratively so that translation of those fragments can be completed (e.g., by the user selecting one or more suggestions and/or by providing translations manually). Once each document fragment has been translated, the system 100 may provide an output document 108 to a suitable recipient, such as a translation services client.

In some cases, the output document 108 may be available to client device 104 and/or to the client application, but this is not required of all embodiments. Independent of architecture, it may be appreciated that either the client application or the backend infrastructure 102 can provide a completed document as output to a suitable recipient.

The backend infrastructure 102 may be configured to communicably couple to multiple client devices; an example second client device is shown as the client device 110. The client device 110 can likewise instantiate an instance of the client application, can likewise receive documents as input, can communicably couple to the backend infrastructure 102, and so on. For simplicity of description, the embodiments that follow reference only the client device 104 and the associated instance of the client application; it is appreciated, however, that the system 100 is not limited to communication with only a single frontend instance.

The backend infrastructure 102 can be implemented in a number of suitable ways. In many cases, the backend infrastructure 102 includes one or more host servers, each including respective processing and memory resources. In other cases, the backend infrastructure 102 may be at least partially containerized or virtualized over distributed hardware. In yet other implantations, the backend infrastructure 102 can be defined by cooperation of multiple discrete host servers and/or virtual servers, communicably intercoupled in a suitable manner.

For simplicity of description and illustration, the backend infrastructure 102 is described herein with reference to a particular example architecture show in FIG. 1, however, it may be appreciated that this is merely one example and that the functions and operations of a system as described herein and in particular a backend of a system as described herein can be implemented in a number of suitable ways.

As noted above, the system 100 includes the backend infrastructure 102. The backend infrastructure 102 can include an API gateway 112 configured to facilitate communication between different functional portions of the backend infrastructure 102 and one or more instances of the client application, such as the client application instance instantiated over the client device 104.

The API gateway 112 can be implemented in a number of suitable ways; in some cases it may not be required. In many configurations, the API gateway 112 may be configured to receive one or more requests from one or more client applications and, in response to receiving such requests, may forward the requests to one or more appropriate endpoints. In some cases, the API gateway 112 may be configured to construct a separate request in response to, and/or with, a received request from a client device or application. For example, the API gateway 112 may receive a first request from a client application. The API gateway 112 can use the request to generate a second request that may, in turn, be forwarded to another component of the backend infrastructure 102.

As with other instances of software and/or other functional elements of the system 100, the API gateway 112 can be configured as an instance of software instantiated by cooperation of a processor and memory. In particular, a processing resource allocated to the API gateway 112 can access a memory resource allocated to the API gateway 112 to retrieve therefrom an executable asset. Together, the processing resource and the memory resource can load the executable asset into a working memory to instantiate software configured to perform, coordinate, or execute an operation associated with a function of the API gateway 112. Collectively, such resources are represented in the figure as the resource allocations 112a.

In many examples, the API gateway 112 can operate as a GraphQL™ gateway. In other cases, the API gateway 112 can operate as a reverse proxy.

In many cases, the API gateway 112 can be configured to receive from a client application a request to retrieve or generate one or more translation suggestions corresponding to a document fragment. The document fragment may be shown on a graphical user interface of a client application executing on the client device 104. In some cases, the document fragment may not be shown in the graphical user interface; the client application may be configured to pre-request suggestions corresponding to upcoming document fragments. A person of skill in the art may readily appreciate that a client application as described herein can request translation suggestions of the backend infrastructure 102 by submitting a request to the API gateway 112 in response to a number of events and/or at different implementation-specific times.

As noted above, a request for translation suggestions can be made in respect of any suitable number of document fragments. In some cases, a client application is configured to submit a request to the backend infrastructure 102, the request including multiple discrete document fragments to translate. Many examples are possible.

As with other embodiments described herein, a request from a client application that is received at the API gateway 112 can take any suitable form or format; in many cases, requests can include a body formatted as a JSON string. As one example, a client application can submit a request including a JSON-formatted body such as:

```
{
  "source" : "English",
  "target" : "Spanish",
  "fragment" : "[English language string of text]",
  "client_uuid" : "5f0c9d68-3902-11ed-a261-0242ac120002"
}
```

Once the API gateway 112 receives such a request, it may generate or create one or more requests to other elements of the backend infrastructure 102, such as a request to an HT database manager 114 or an ML engine request manager 116.

As with other embodiments described herein, the HT database manager 114 can be configured to search one or more databases of prior human translations to retrieve prior human translations similar to the document fragment received by the API gateway 112 from the client application. As noted above, the HT database manager 114 can be configured to identify exact and near matches to the document fragment, one or more HT translation chains, and so on. Once appropriate content is obtained from the one or more databases, the HT database manager 114 can generate a response message to the API gateway 112 that includes any suitable exact matches, near matches, and/or translation chains.

Similarly, as with other embodiments described herein, the ML engine request manager 116 can be configured to leverage one or more trained machine learning engines to translate the document fragment from the source language to the target language. The ML engine request manager 116 may be configured to leverage multiple different engines to translate a given document fragment with different techniques or with different engines trained on different corpuses. For example, in some embodiments a request from a client application can include a document type or field. As an example:

```
{
  "field" : "medical",
  "source" : "English",
  "target" : "Spanish",
  "fragment" : "[English language string of text]",
  "client_uuid" : "5f0c9d68-3902-11ed-a261-0242ac120002"
}
```

In this example, a document fragment is tagged with data indicating that the content of the fragment is medical. In this example, the ML engine request manager 116 may select one or more ML models or engines specifically trained on medical corpuses. In other cases, other differently-trained engines can be selected by the ML engine request manager 116. For example, engines trained on legal corpuses can be selected for document fragments tagged with data indicating legal content, engines trained on pharmaceutical corpuses can be selected for document fragments trained on pharmaceutical document fragments, and so on.

In many cases, the API gateway 112 can facilitate cooperation between the ML engine request manager 116 and the HT database manager 114 to generate one or more hybrid suggestions. For example, the HT database manager 114 may determine that an input document fragment (or a similar, near string) appears in a database, but with an incorrect language pair. Continuing a preceding example, a source language of a document fragment may be English and a target language may be Japanese. In this example, the HT database manager 114 may determine that no existing English-Japanese translation exists for the document fragment, but an English-Korean translation does exist. In this example, the HT database manager 114 can provide the Korean translation as input to the ML engine request manager 116, indicating an input language of Korean and an output language of Japanese. Thereafter, the ML engine request manager 116 can select an appropriate Japanese-Korean engine, and can return one or more translations of the Korean phrase in Japanese. Thereafter, the API gateway 112 (in some embodiments) can generate an aggregate hybrid suggestion based on the resulting Japanese translation. The hybrid suggestion can be intermingled and/or sorted with other ML or HT translations obtained by the API gateway 112.

In further examples, a hybrid suggestion can be provided in a different manner. For example, an HT translation chain can be identified that includes translation to and from the same languages, after which machine translation may provide a more useful or high confidence result. For example, in some embodiments, a system as described herein can be used to translate from English to Mandarin. In an HT database, translation of a working fragment may be queried and returned. Among the results returned may be a first translation of the working fragment (or similar phrase) from English to Korean. The results may also include a translation of a phrase similar to the Korean result translated from Korean to Japanese. In addition, there may be a translation of the Japanese phrase back to English. The initial input English phrase may be different from the English version obtained from the Japanese-English language pair. In this manner, the system may automatically obtain two different English-language phrasings articulating a similar or identical concept. Each of these phrases can be provided as input to an ML translation engine which may determine different confidences for each version of the same phrase.

The foregoing examples are not exhaustive; it may be appreciated that HT translation suggestions, ML translation suggestions, and hybrid suggestions can be obtained in a number of suitable ways. As noted above, the suggestions may be ordered (by confidence or relevance or another metric) together and sorted appropriately or, in other embodiments, may be shown in different dedicated regions of a user interface, such as may be rendered by a client application on the client device 104.

In some cases, the backend infrastructure 102 can further include a request handler for managing requests of third-party translation services, such as commercial translation services. For example, the backend infrastructure 102 can include a third-party ML request manager 118 configured to receive translation requests from (by proxy) the API gateway 112 and to generate in response one or more requests to external/third-party translation systems, which may be operated by third parties and/or may be instantiated on external hardware resources. Thereafter, the third-party ML request manager 118 can submit results of third-party translations to the API gateway 112 in much the same manner as the ML engine request manager 116.

In some cases, the third-party ML request manager 118 can be leveraged for load balancing and/or failover support for the ML engine request manager 116.

The backend infrastructure 102 can also include one or more dedicated managers or services for segmenting documents into sections and fragments as described above. For example, the backend infrastructure 102 can include a document segment manager 120 and a fragment partitioner 122.

The document segment manager 120 of the backend infrastructure 102 can be configured to convert input documents, such as the document 106 into a uniform format. The document segment manager 120 can be configured to receive structured data, image data, or any other suitable document data. The document segment manager 120 can be configured to segment the input data (and/or optionally OCR that input as necessary) using any suitable technique. In some cases, as noted above, the document segment manager 120 can be configured to segment a document by document-specific sections. In other cases, the document segment manager 120 can be configured to leverage format of the input document to infer document segments as intended by an author of the document. For example, headings may be identified as prefixed with an incremented alphanumeric value, by special formatting (e.g., bold, italic, underline, font size), position on page (e.g., centered), or by any other suitable technique. A person of skill in the art will readily appreciate that many suitable techniques for segmenting input text into sections may be used.

Similarly, the fragment partitioner 122 can be configured in a number of suitable ways. In some cases, the fragment partitioner 122 can be configured to receive as input a text string, which in turn may be extracted from and/or may be associated with a particular working document section. The fragment partitioner 122 may be configured to subdivide the text string into sentences and/or into any other suitable sentence part, such as semicolon-delimited clauses. In many embodiments, however, the fragment partitioner 122 may be configured to extract sentences from an input text string.

The fragment partitioner 122 and document segment manager 120 can each operate, in some embodiments, as a generator function configured to iteratively serve to the client application via the API gateway 112 one or more working fragments and/or one or more working sections. In some cases, the document segment manager 120 can be configured to provide generator input to the fragment partitioner 122, which in turn can feed generatively output document segments as input to the HT database manager 114, the ML engine request manager 116, and/or one or more third-party databases such as via the third-party ML request manager 118.

In some cases, the fragment partitioner 122 may be configured to operate as a service to the client application; in such embodiments, the client application may retrieve from the fragment partitioner 122 a working document fragment, and thereafter the client application can manage and/or generate one or more requests to other discrete services of the backend infrastructure 102, such as to the HT database manager 114, the ML engine request manager 116, and/or one or more third-party databases such as via the third-party ML request manager 118.

In this manner, the system 100 can cooperate to provide useful aid and assistance to a human translator (and/or a team of translators working collaboratively) operating the client device 104.

For example, a human translator using the client device 104 can launch the client application and provide as input to the client application the document 106, which is to be translated by the translator.

In response to receiving as input the document 106, the client application can architect a request 124 to the backend infrastructure 102. The API gateway 112 can receive the request 124, including the document 106 and/or a reference thereto, and generate from the request 124 a request of the document segment manager 120. The document segment manager 120 can reformat and/or segment the document 106 in a suitable manner (e.g., converting the document to a uniform structured format). Thereafter, the document segment manager 120 can durably store the formatted, segmented, original document in a database 126. Specifically, the document segment manager 120 may be configured to structure a request 128 to the database 126 that causes the database 126 to store a structured data representation of the document 106 therein.

Once the original document is stored in the database 126, the document segment manager 120 can generate a response, optionally, to the client application that the document has been successfully converted and stored.

Thereafter, the translator may begin translation work. The translator may indicate intent to begin translation by operating a graphical user interface of the client application rendered on the display 104c. In response to such an indication (e.g., a button press, providing credentials to log in, and so on), the client application may generate a request to retrieve from, as one example, the database 126, a working section of the document to show to the translator for translation.

The request generated by the client application can be received by the API gateway 112 and may be forwarded, modified, or unmodified, to the document segment manager 120. In other cases, the API gateway 112 can generate and/or architect a separate request, based on the input request, to the document segment manager 120.

In response, a section of the working document may be retrieved by the document segment manager 120 from the database 126. The section can be provided as input to the fragment partitioner 122 which, in turn, may subdivide the section into fragments. The fragmentation by the fragment partitioner 122 may be performed according to a user/translator preference, according to a business rule of a translation organization, and/or may be performed in a language or document specific manner.

Thereafter, the fragment partitioner 122 can generate a response directed to the client application that includes a document fragment for display to the translator via the graphical user interface.

In addition, the fragment partitioner 122, the API gateway 112, and/or the client application can leverage the document fragment output by the fragment partitioner 122 to request translation suggestions from one or more of the HT database manager 114, the ML engine request manager 116, and/or the third-party ML request manager 118. Each of these engines/modules/services can receive the document fragment as input, and may provide as output one or more ML suggestions, HT suggestions, or hybrid suggestions.

For example, the ML engine request manager 116 can be configured to receive the document fragment as input and select one or more ML translations engines from a set of ML engines. The ML engines may be stored, at least in part, in an engine database 130. For example, the ML engine request manager 116 may be configured to select an ML engine based on the original language, the target language, a translation services client associated with the translator and/or the input document (e.g., the document 106), and so on. Many criteria may be used to select an engine to translate the input document fragment. Once at least one engine is selected (which may happen in real time or in advance of document segmentation or segment fragmentation), the ML engine request manager 116 can leverage that engine to obtain a ML translation suggestion based on the input document fragment. Thereafter, the ML engine request manager 116 can encapsulate the translation suggestion(s) in a structured data object which, in turn, may be transmitted to the API gateway 112 and/or to the client device 104 directly.

The third-party ML request manager 118 can be configured and operated in a similar manner as the ML engine request manager 116 and may be configured to provide suggestions to the API gateway 112 and/or to the client application in response to receiving a document fragment as input.

Similarly, the HT database manager 114 can be configured to receive the document fragment as input and, in response, generate and submit a query to a database 132 which may contain one or more tables of different previously-translated strings in different language pairs. As with other embodiments described herein, the HT database manager 114 can be configured to search any suitable side of a previously-translated string pair, may be configured to look for and leverage translation chains including multiple hops from an original language to a target language, and so on. Thereafter, the HT database manager 114 can encapsulate the translation suggestion(s) in a structured data object which, in turn, may be transmitted to the API gateway 112 and/or to the client device 104 directly.

In further embodiments, the HT database manager 114 can be configured to search the database 132 for near matches of the document fragment, for example, matches that exhibit semantic similarity, linguistic similarity, and/or string similarity to the document fragment. For example, Levenshtein distance or cosine similarity may be calculated between the document fragment and one or more rows of the database 132. If the distance or similarity (normalized in many cases by string length) exceeds a threshold or otherwise satisfies a threshold, the corresponding information in the matched row of the database 132 may be returned.

In other cases, the HT database manager 114 may be configured to determine semantic similarity, such as by vectorizing one or more words or phrases. In other cases, the HT database manager 114 can be configured to lemmatize each word of the document fragment, generate a set from those words, and determine a magnitude of intersection between the set and sets of lemmatized words extracted from the database 132. These examples are not exhaustive; the HT database manager 114 may determine near matches in a number of suitable ways.

Once the API gateway 112 and/or the client application receive one or more translation suggestions (including HT translations, hybrid translations, and/or ML translations), the suggestions can be aggregated together (or in some cases, kept separate by type) and sorted according to statistical confidence. Thereafter, the suggestions can be rendered in the graphical user interface for the translator.

In some embodiments, as noted above, the translator may be provided with an unrestricted editing region, thereby permitting the translator to define his or her own document fragments. In response to an edit by the translator to the unrestricted editing region, the content of the unrestricted editing region can be transmitted from the client application to the fragment partitioner 122 for automatic fragmentation and suggestion acquisition, such as described above.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that any of the features and functions of the backend infrastructure 102 of the system 100 can be implemented in whole or in part as instances of independent software. In some cases, each independent component of the system 100 can be implemented on dedicated hardware (whether virtualized over physical infrastructure/hardware or otherwise), including processing resources and memory resources. For example, in such examples, each component of the system 100 can be associated with a particular instance of software, instantiated by cooperation of a processing resource or allocation and a memory resource or allocation. More generally, any component of the system 100 can be instantiated over any suitable computing resource. To illustrate such resources, FIG. 1 further depicts processing resources associated with the API gateway 112 as the resource allocations 112a, processing resources associated with the HT database manager 114 as the resource allocations 114a, processing resources associated with the ML engine request manager 116 as the resource allocations 116a, processing resources associated with the document segment manager 120 as the processing resources 120a, processing resources associated with the fragment partitioner 122 as the processing resources 122a, and processing resources associated with the third-party ML request manager 118 as the processing resources 118a.

As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Further, the foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete micro services, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

More generally, as described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements. The term "memory" as used herein is similarly intended to encompass physical and virtual memory allocations suitable for interoperation with a processor or other computing resource as described herein.

Further, it may be appreciated that a graphical user interface as described herein can be operated by the client application and/or client device in a number of suitable ways. Similarly, a graphical user interface can be organized and/or may be configured to present information in a number of suitable ways.

Figure 2:
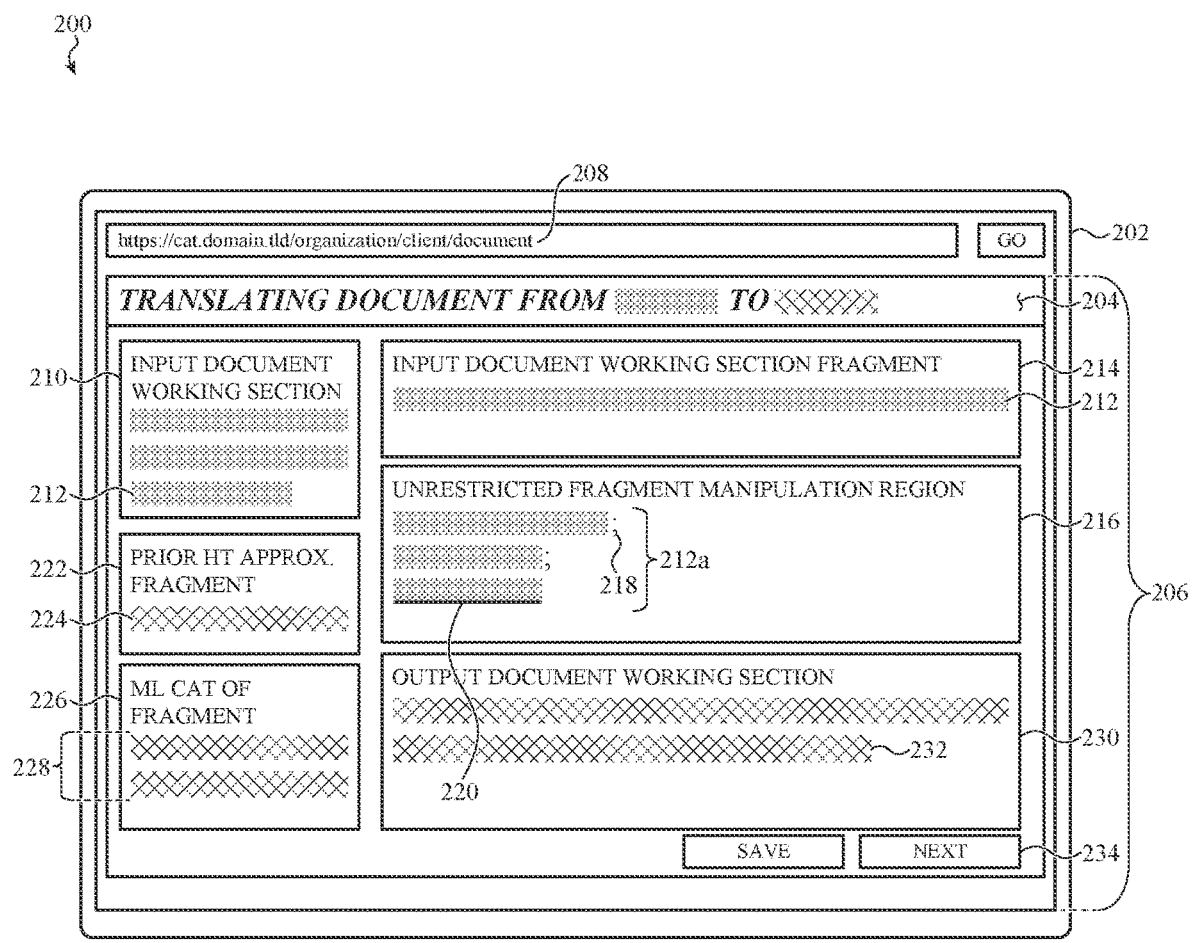
FIG. 2 depicts a client device rendering a graphical user interface providing frontend functionality of a computer-aided translation platform, such as shown in FIG. 1.

FIG. 2 depicts a client device rendering a graphical user interface providing frontend functionality of a computer-aided translation platform, such as shown in FIG. 1.

In particular, the client device 200 can include a display 202 that includes an active display area into which a graphical user interface 204 may be rendered. The graphical user interface 204 may be rendered by operation of an instance of software referred to as a client application. The client application can be associated with frontend functionality of a system as described herein. The frontend can be configured to communicably couple to a corresponding backend over any suitable protocol, network, or combination thereof. The backend may be configured as described above in reference to FIG. 1, but this is not required of all embodiments.

The frontend application can be instantiated by cooperation of a processor and memory as described above. Specifically, a processor of the client device 200 can cooperate with a memory of the client device 200 to instantiate an instance of the frontend application.

The frontend application can be a native application or may be a browser application configured to access a web address to load and render a web page. In some cases, a native application embodiment can include one or more web views to view content.

The frontend application can be configured to render the graphical user interface 204 to present information to a human translator of a particular working document. In particular, the graphical user interface 204 can include a document view 206 configured to assist a human translator in translating a document, which can in some cases be accessed via URL such as a document-specific URL 208. The document-specific URL 208 may be particular to a document in need of translation, may be particular to a translation session (e.g., an authenticated session), as examples. A person of skill in the art may appreciate that URLs may vary from embodiment to embodiment and/or documents may be accessed or referenced by a system as described herein in a different manner.

The document view 206 of the graphical user interface 204 can include multiple sections, each conveying different information to a translator. For example, the document view 206 can include a first section 210 configured to depict for the translator a current working section of an original document, which can be fragmented into document fragments, such as described above. In the illustrated embodiment, a section of an original document is shown in the first section 210. The depicted section of the original document includes a document fragment 212, while also depicting other adjacent fragments of the same section so as to provide the translator with section context when translating the document fragment 212.

The document fragment 212 can be generated, for example, by a fragment partitioner such as described in reference to FIG. 1.

The document view 206 of the graphical user interface 204 includes a second section 214 configured to show the document fragment 212 independent from the document section shown in the first section 210.

The document view 206 of the graphical user interface 204 includes a third section 216 that also is configured to show the document fragment 212. However, in this graphical user interface, the third section 216 may permit the translator to edit the raw text of the document fragment 212. In this manner, the translator can edit the document fragment 212 into the edited document fragment 212a. In the illustrated example, the translator may insert one or more characters 218, such as semicolons and newline characters to subdivide the edited document fragment 212a into smaller discrete fragments.

The graphical user interface 204 can thereafter be configured to enable selection of sub-fragments of the edited document fragment 212; selection of a sub-fragment may be indicated visually, such as with an underline. In the illustrated embodiment, a sub-fragment 220 is selected. The sub-fragment 220 has been isolated by the translator by insertion of the one or more characters 218.

It may be appreciated that insertion of the one or more characters 218 by the translator is merely one example; in other embodiments, other edits may be provided to subdivide or otherwise manipulate the document fragment 212.

Once a portion of the document fragment 212 is selected or otherwise identified by the translator (e.g., the sub-fragment 220), the client application may generate one or more requests to the backend to obtain suggestions therefrom for translations from the original language to the target language (original language text indicated by stippling, target language text indicated by lattice cross-hatching). The suggestions can include ML suggestions, HT suggestions, and/or hybrid suggestions.

In the illustrated embodiment, different suggestion types can be presented in different locations of the graphical user interface 204. For example, a human and/or hybrid region 222 can be dedicated to present HT suggestions and hybrid suggestions, such as the HT suggestion 224. In addition, an ML suggestion region 226 can be dedicated to present ML suggestions to a translator, such one or more ML suggestions 228.

The graphical user interface further includes a working region 230 in which the translator can provide a translation 232 of the document fragment 212. The working region 230 can be populated by, in some cases, the translator selecting one or more suggestions (which can in response to engagement by the translator, can be copied from a respective suggestion region into the working region 230). Once the translator is satisfied, the translator may select an affordance 234 that causes different section and/or different document fragment to be shown in the second section 214 and/or the third section 216.

These foregoing embodiments depicted in FIG. 2 and the various alternatives thereof and variations thereto are presented, generally, for purposes of explanation, and to facilitate an understanding of various configurations and constructions of a system and how such a system may interact with a graphical user interface, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, the flow of structured data or information from a frontend to a backend of a system as described herein may vary from embodiment to embodiment. For example, as noted above, a frontend may be configured to segment a document into sections and fragments in some embodiments whereas a backend may be so configured in other embodiments. In some cases, a frontend may be configured to extract document fragments from a document section or segment extracted by a backend. In other cases, a frontend may be configured to generate one or more requests to ML translation engines, HT database managers, or other components described above with respect to FIG. 1. Many configurations and constructions are possible; a system as described herein can be architected in a number of suitable ways.

Figure 3:
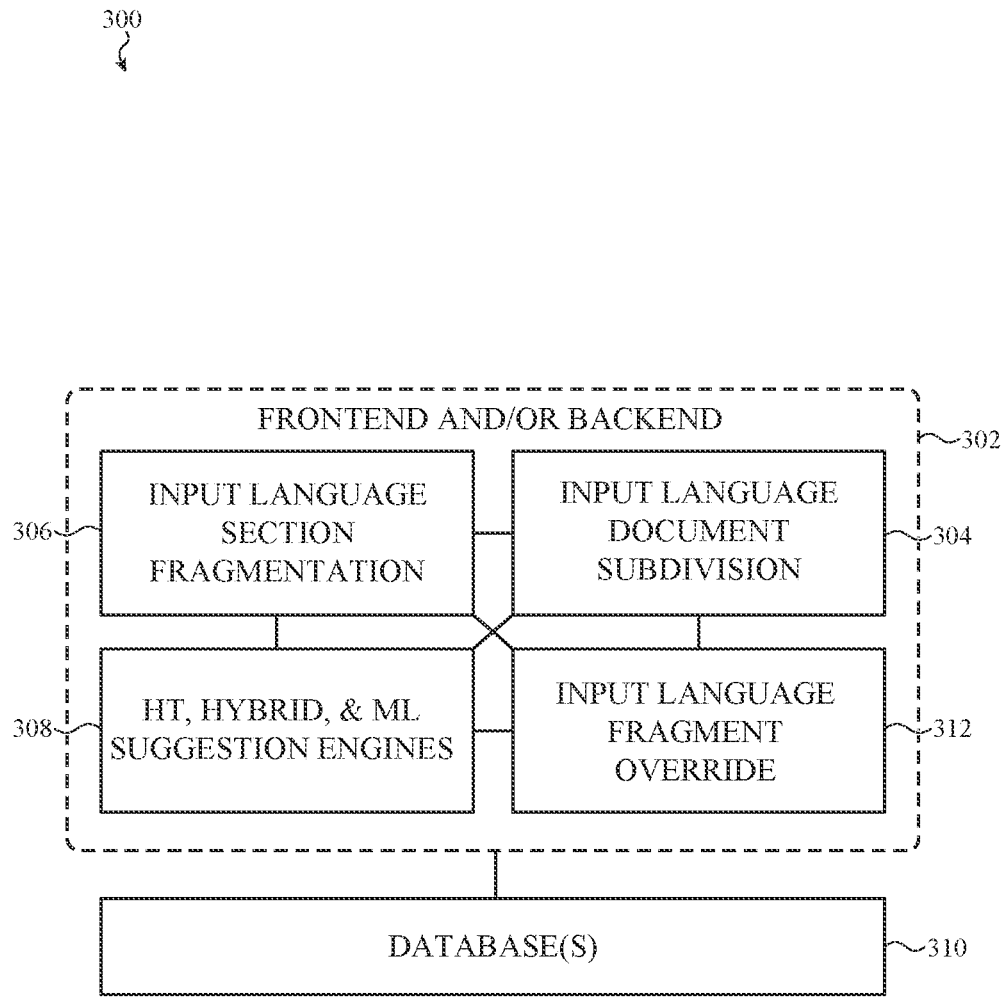
FIG. 3 depicts a simplified architecture diagram of a system, such as described herein.

FIG. 3 depicts one example schematic diagram of a system as described herein. The system 300 can include a frontend and a backend. The frontend and the backend can be instantiated over dedicated hardware as described above, and may be communicably coupled either directly or indirectly (e.g., via a proxy service, a reverse proxy, a gateway service, and so on). More generally, the frontend and backend can be coupled over a computing network, which may include one or more network segments traversing the open internet. In many case, the backend and frontend communicate with one another over industry standard secure protocols, such as TCP, HTTP, UDP or the like. This is not required of all embodiments.

Collectively, the frontend and backend defining operations of the system 300 are identified in FIG. 3 as the software platform 302. The software platform 302 includes multiple functional elements, each of which may serve as a portion or function of a frontend software instance or a backend software instance. In this manner, it may be appreciated that any function of a system as described herein can be performed, at least in part, by a frontend or a backend; there is no express requirement that either instance exclusively perform any particular function as described herein.

The software platform 302 can include multiple functional elements, as noted above. These functions and operations can be performed entirely by the frontend, entirely by the backend, or in part by each cooperatively.

The software platform 302 includes an input language document subdivision functional elements 304, which can be configured to convert format of an input document and to subdivide the (converted, optionally) input document into sections. Section delimiters and definitions can vary from embodiment to embodiment.

The input language document subdivision functional elements 304 can cooperate with input language section fragmentation functional elements 306, which can receive as input a section of an input document and can provide as output, a generator, an array, or another data structure or callback that in turn converts document sections or other document parts into document fragments as described herein. As noted above, document fragments can be delimited by language-specific punctuation, grammar rules, linguistic cues, and so on. In this manner, the input language document subdivision functional elements 304 can cooperate with the input language section fragmentation functional elements 306 functional elements to break an input document, slated for translation, into manageable translation tasks.

The software platform 302 can also include one or more suggestion engines, such as the suggestion engines 308. The suggestion engines 308 can include MT suggestion engines configured to receive as input a document fragment and to provide as output a translated version of that fragment into a target language. The suggestion engines 308 can include multiple MT engines, which may be stored in and/or otherwise accessible from one or more databases 308. As noted above, different document fragments may inform different selections of different MT translation engines.

In other cases, the suggestion engines 308 can include an HT translation database manager configured to search and/or query one or more databases, such as the one or more databases 310, for strings similar to an input document fragment in an original language. The HT translation database managers can be configured to search both sides of a particular phrase translation pair, may be configured to identify potentially useful translation chains, and so on.

The suggestion engines 308 can also include one or more functional elements to generate hybrid suggestions. The hybrid suggestion engines can leverage both human translations and ML translation functionality to generate machine translations of greater relevance.

The system 300, and in particular, the software platform 302 defining the system 300 can include an option for a translator to modify the form and/or format of a particular automatically generated document fragment. In a more particular phrasing, the software platform 302 further includes an input language fragment override functional element 312.

The input language fragment override functional element 312 can take the form of an unrestricted text editing section rendered in a graphical user interface, such as described above with respect to FIG. 2. Such a section provides a translator with an option to manipulate the original document so as to trigger more precise and/or relevant ML suggestions, HT suggestions, or hybrid suggestions.

For example, a document being translated from a first language to a second language may be a legal document. The legal document may contain a lengthy clause list, separated by semicolons. As known to a person of skill in the art, conventional ML translation engines typically do not exhibit useful performance for lengthy sentences. As a result, conventional computer aided translation systems do not produce useful suggestions to a translator if presented with a legal document, such as in the present example. As a result, a translator of that document is required to manually translate the clause list.

Further, as may be appreciated by a person of skill in the art, many string similarity calculations and algorithms exhibit exponential and/or otherwise nonlinear time complexity. As a result, the longer an input string may be, the longer similarity calculations may require to process which in turn reduces the performance of database search operations, such as those required to identify HT suggestions, as described herein. As such, to search prior translations of nearby strings of a lengthy clause list (such as in the present example) may require a significant amount of processing time.

To account for these and other document-specific and/or fragment-specific inefficiencies in operations of suggestion engines, the system 300 permits a translator to edit the working fragment so that the suggestion engines 308 can exhibit improved performance. More simply, in lieu of spending translation effort translating a lengthy legal clause list, a translator can edit that clause list (e.g., by inserting newlines, changing conjunctions, modifying terms with synonyms, changing punctuation, and so on) into smaller subfragments that may be more efficiently processed by the suggestion engines 308 to generate useful ML suggestions, HT suggestions, and hybrid suggestions.

As an example, FIGS. 4A-4I depict a client device rendering a graphical user interface providing frontend functionality of a software platform, as described herein, including user interface affordances enabling a translator to modify an input document fragment to elicit more relevant ML suggestions, HT suggestions, and hybrid suggestions.

The client device 400 depicted in FIGS. 4A-4I may be any suitable client device, including desktop computing devices, laptop computing devices, cellular phones, tablet devices, dedicated translation terminals, and so on. For simplicity of illustration and description, a desktop computer display device is shown in FIGS. 4A-4I, but it is appreciated that this is merely one example.

The client device 400 can include processing resources and memory resources that cooperate to instantiate a frontend configured to communicably couple to a backend, such as described herein. The client device 400 can additionally include a display 402 that can be leveraged by the frontend to render a graphical user interface 404. The graphical user interface 404 includes a main view 406 in which user interface elements can be rendered.

Figure 4A:
FIGS. 4A-4I depict a client device rendering a graphical user interface providing frontend functionality of a computer-aided translation platform, as described herein.

In some embodiments, such as shown in FIG. 4A, the main view 406 includes a document section view region 408. The document section view region 408 can display text associated with a presently-selected section of a working document undergoing translation by a translator. In the illustrated embodiment, the document section view region 408 depicts one or more document sections. The document sections can be automatically determined from an original input document. The illustrated embodiment depicts a single section, but it may be appreciated that this is merely one example.

Different fragments or portions of the depicted document section may be selectable by a translator operating the client device 400. For example, a translator may select a document fragment 410.

Figure 4B:
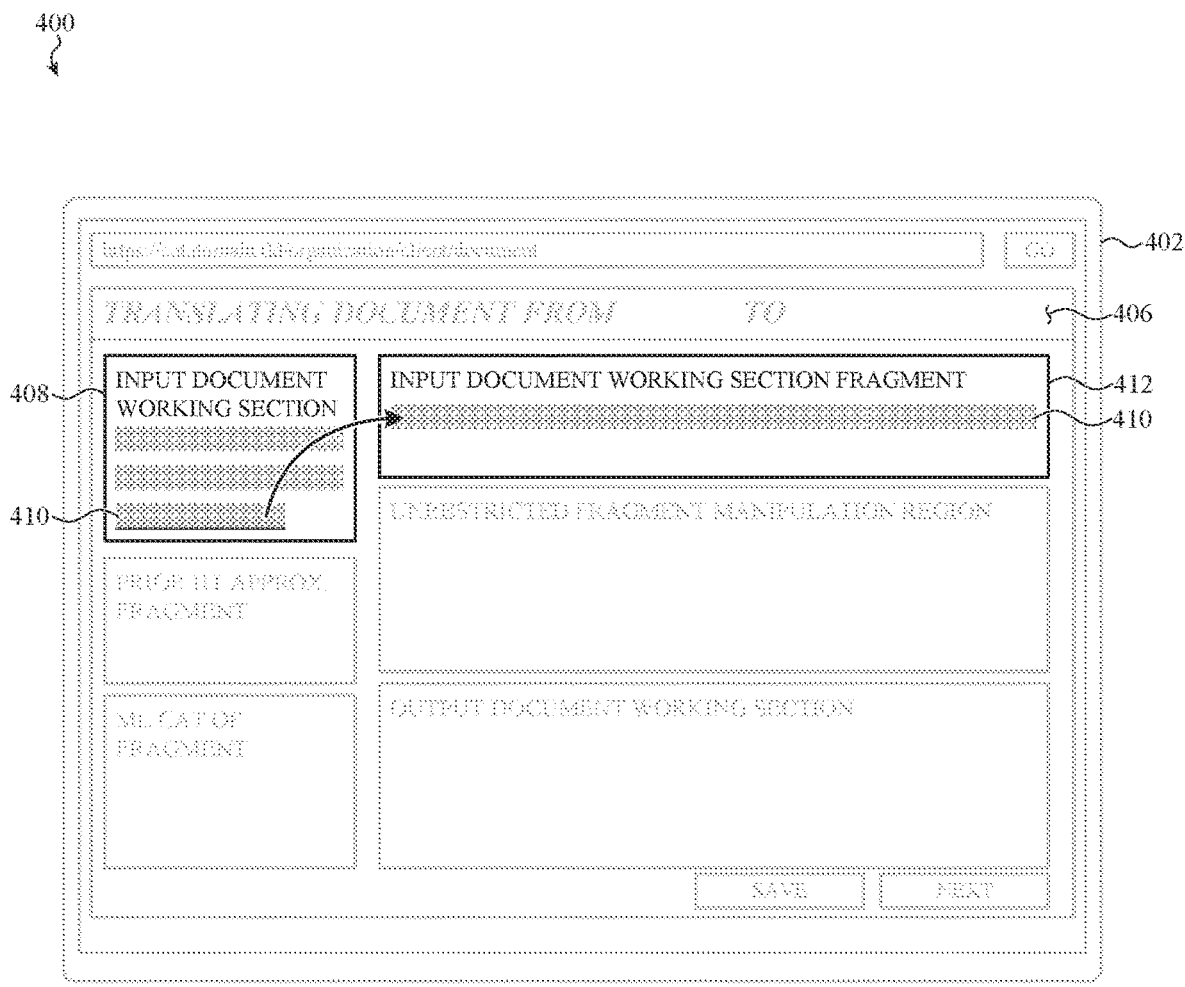
Figure 4C:
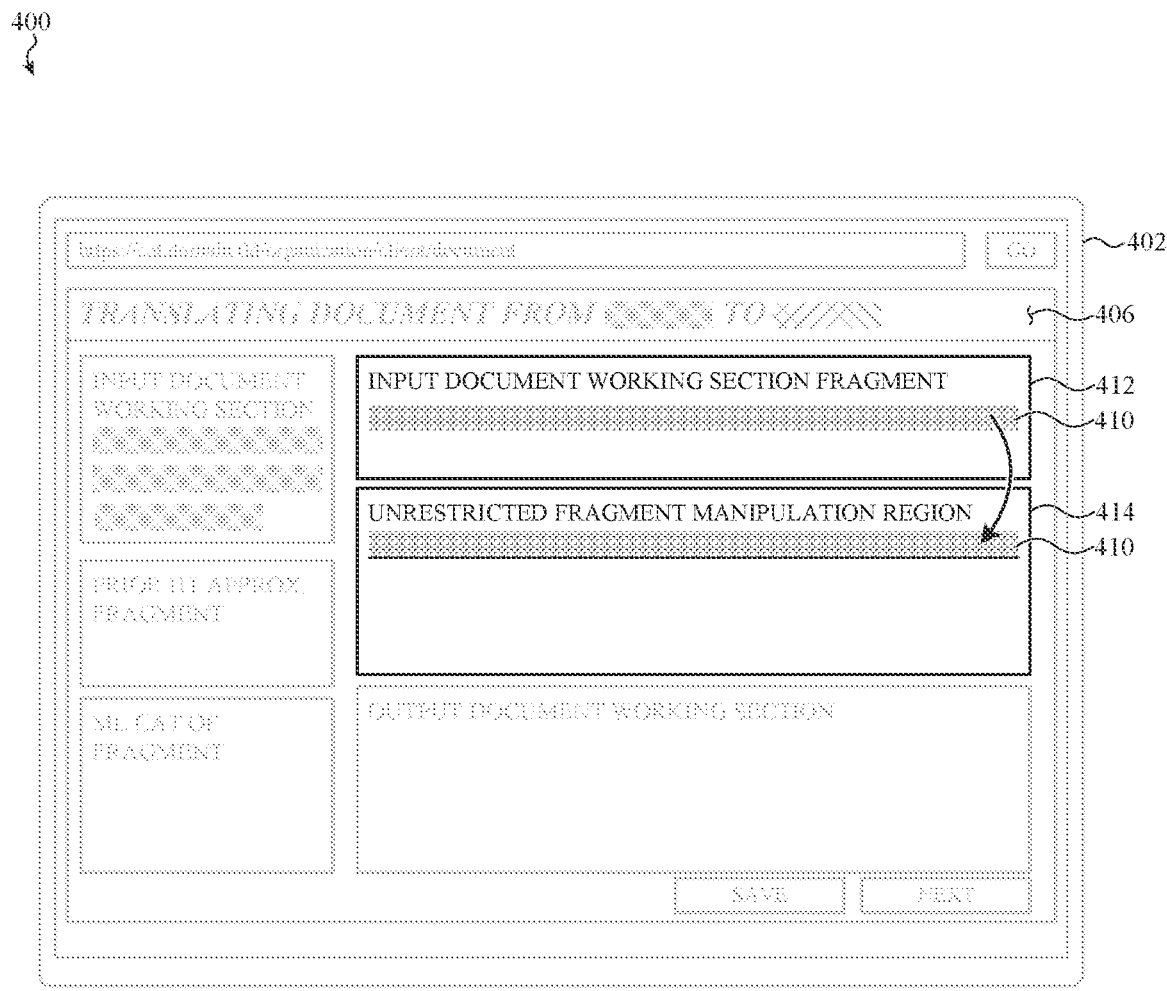

As shown in FIG. 4B, once the translator selects the document fragment 410 from the document section view region 408 depicting a document section including that fragment, the document fragment 410 may be shown separately in a document fragment view region 412. In some cases, the document fragment view region 412 may render the document fragment 410 in a larger manner and/or with a different font than as shown in the document section view region 408. In addition, such as shown in FIG. 4C, the document fragment 410 may be additionally copied into an unrestricted editing region 414.

The unrestricted editing region 414 can provide the translator with an option to change any aspect of the original input text (specifically, the document fragment 410) so as to elicit more useful ML suggestions, HT suggestions, or hybrid suggestions.

Figure 4D:
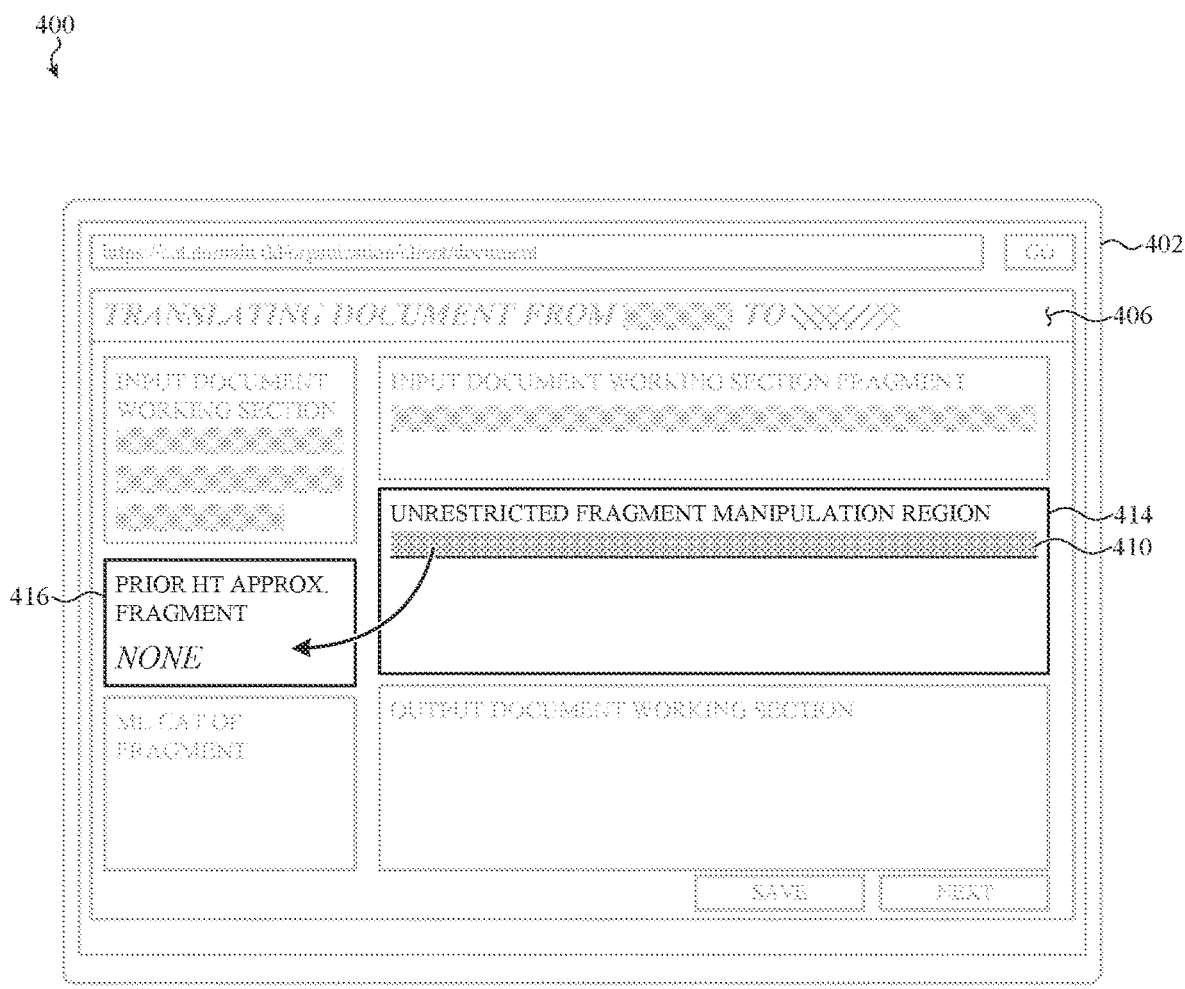

For example, in some cases, the document fragment 410 may correspond to a long sentence in the original language of the input document. In such cases, a HT suggestion engine and/or HT suggestion database manager may be unable to match the document fragment 410 against any prior human translation available in relevant databases. For example, as shown in FIG. 4D, an HT suggestion region 416 may not be able to provide any suggestions to the translator, given the length or phrasing of the document fragment 410.

Figure 4E:
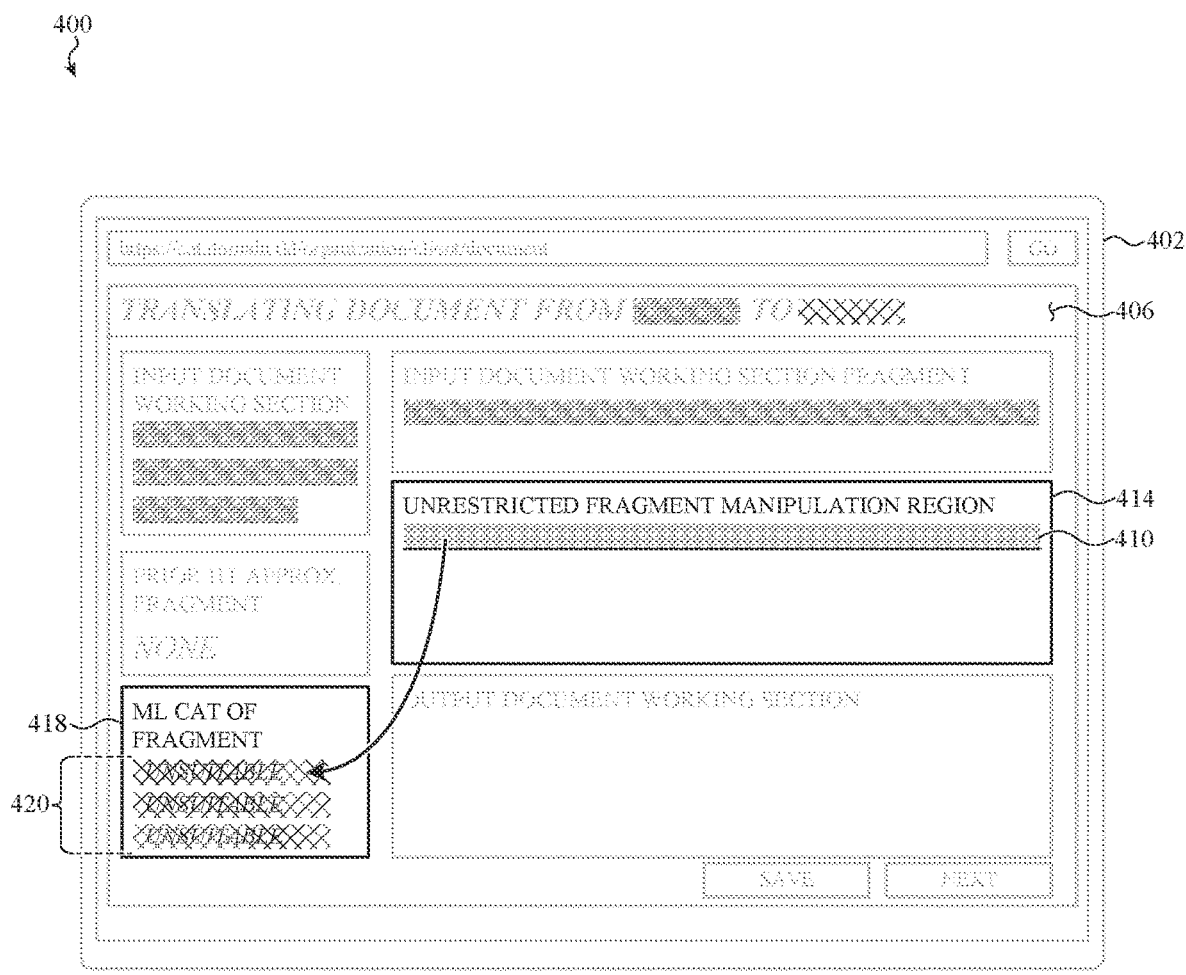

Similarly, accurate and useful MT suggestions may be difficult to obtain. For example, as shown in FIG. 4E, an ML suggestion region 418 may render for the translator one or more unsuitable translations 420. The unsuitable translations 420 may be provided in the correct target language, indicated by lattice cross-hatch, but the translation may be unsuitable for use by the translator. For example, the unsuitable translations 420 may be literal, informal, grammatically incorrect, incomplete, contextually inaccurate, or otherwise not useful.

In such circumstances, the translator may benefit from modifying the form and/or format of the document fragment 420 such that HT suggestions, ML suggestions, and/or hybrid suggestions may be more accurately identified and presented to the translator.

Figure 4F:
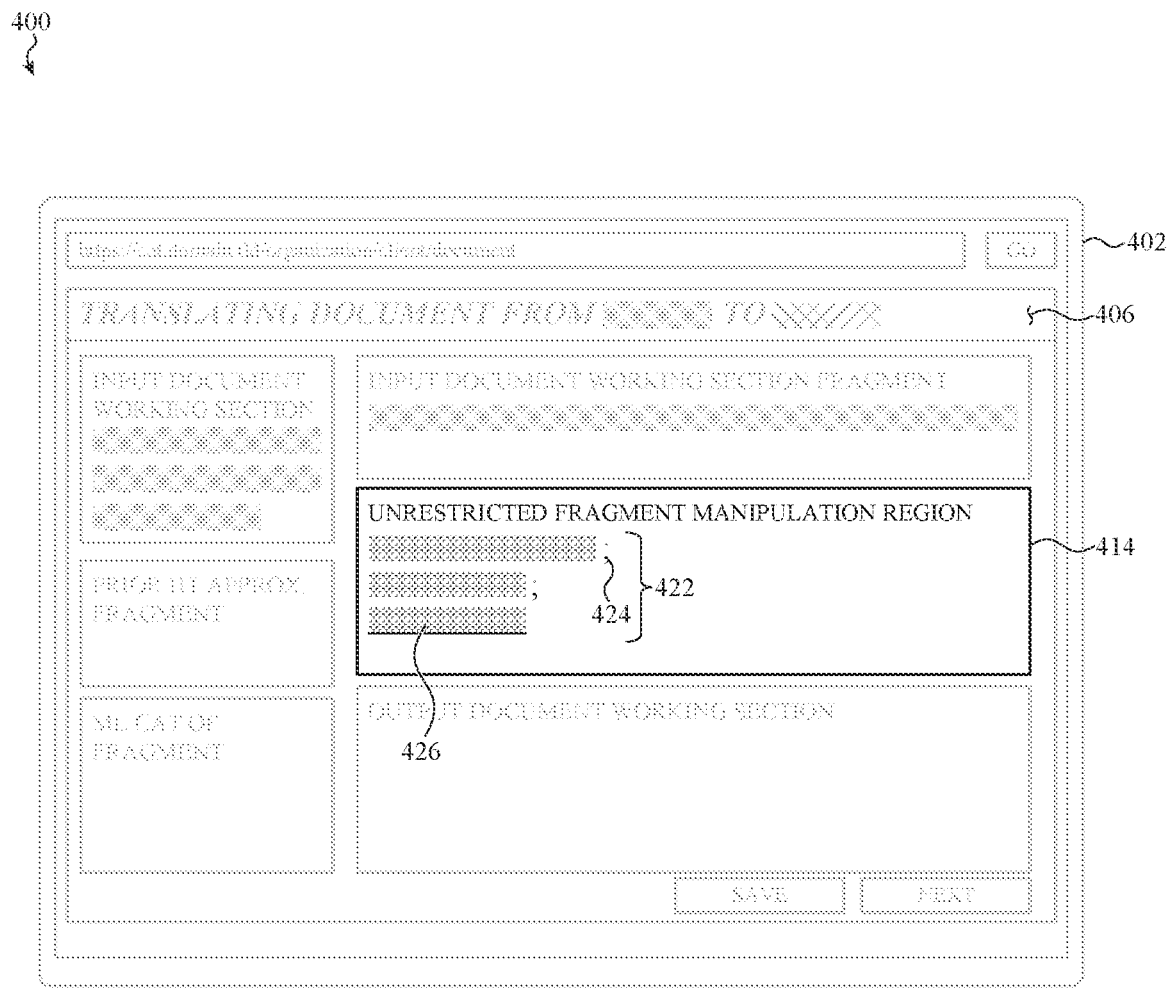

For example, as shown in FIG. 4F, the translator may leverage the unrestricted editing region 414 to modify the document fragment into the sub-fragments 422, delimited by the newline characters and/or other punctuation (such as the semicolons 424). In response to editing by the translator, the client device 400 can make selectable the newly-defined sub-fragments. Thereafter, the translator can select one of the sub-fragments, such as the sub-fragment 426. in other cases, selection of a sub-fragment may not be required; top-rated or top-ranked ML suggestions, or hybrid suggestions, or HT suggestions can (of each and every sub-fragment of the modified input text) be automatically added to a working portion of the graphical user interface 404.

Once the graphical user interface 404 and/or the client device 400 receives a selection of the sub-fragment 426, the sub-fragment 426 can be provided as input to the same data processing pipeline to which the document fragment 410 was previously provided.

Figure 4G:
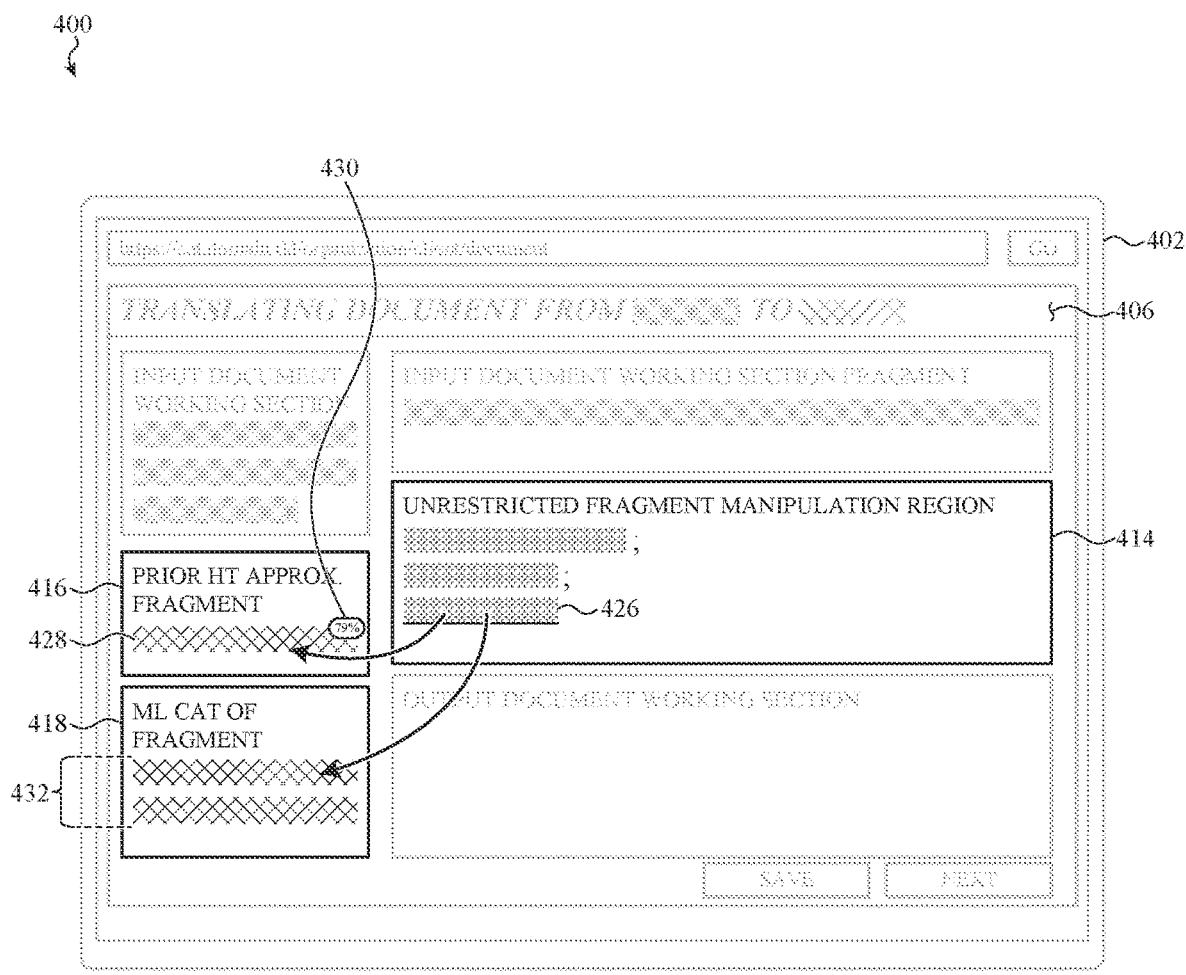

Because the sub-fragment 426 is a shorter phrase (and/or a more grammatically accurate phrase, a simpler phrase with identical meaning, and so on) than the document fragment 410, suggestions may be more accurate and therefore more useful to the translator. For example, as shown in FIG. 4G, the HT suggestion region 416 may be populated with a prior human translation 428. The prior human translation 428 may in some cases be identical to the sub-fragment 426, whereas in others the prior human translation 428 may be a close match (e.g., exhibiting string similarity, as one example). In some embodiments, a confidence score 430 can be rendered within or near the prior human translation 428.

Machine translation suggestions may likewise be improved when operating on shorter strings. For example, as shown in FIG. 4G, the ML suggestion region 418 may be populated with one or more machine translations 432 of the sub-fragment 426. The one or more machine translations 432 may be sorted according to confidence output by an associated machine translation engine. In some embodiments, a confidence score can be rendered within or near the one or more machine translations 432, but this is not required of all embodiments.

Figure 4H:
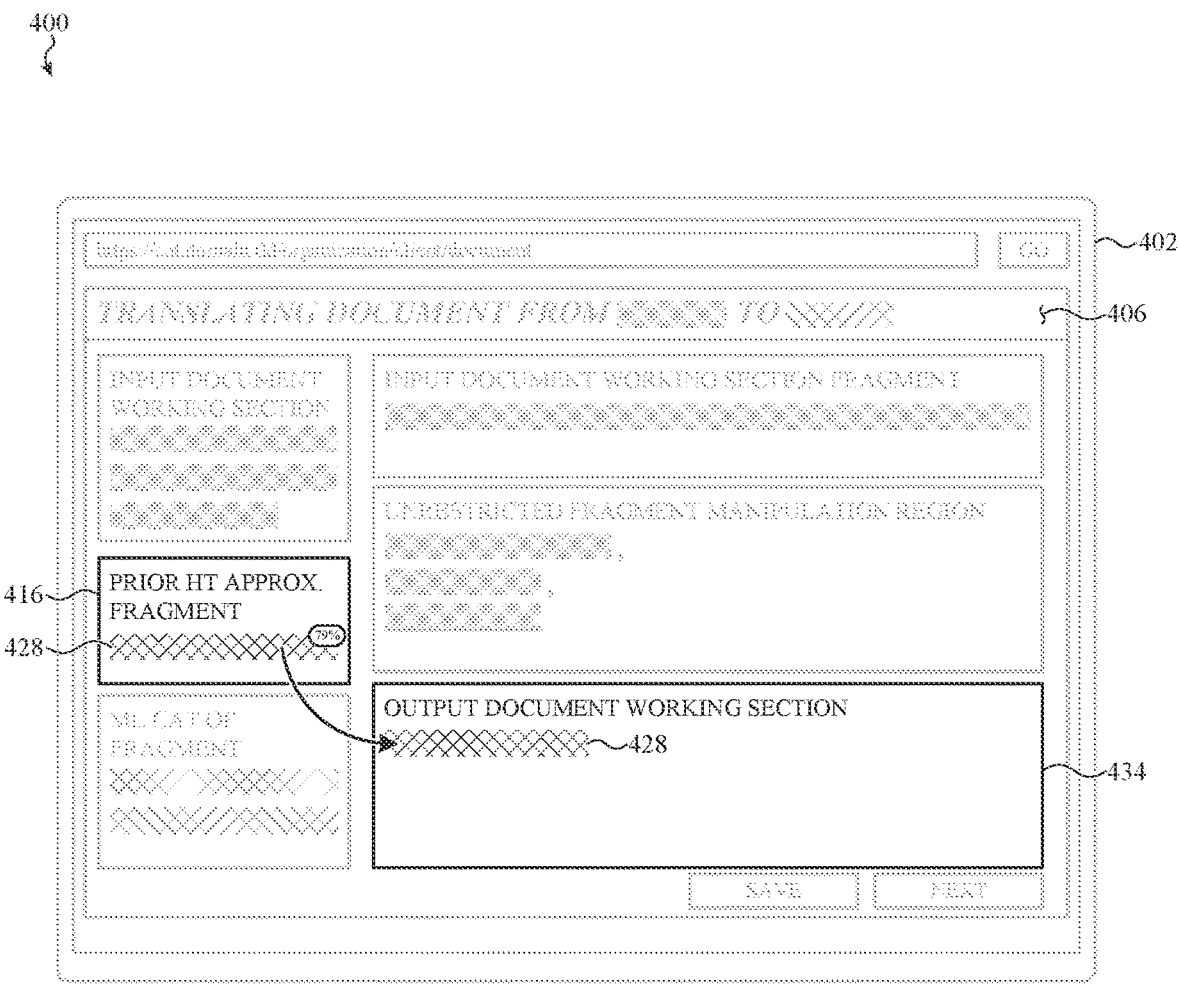

The system can render suggestions within the HT suggestion region 416 and/or the ML suggestion region 418 as selectable user interface elements. In this manner, the translator can select any of the translation suggestions in order to cause the graphical user interface to insert content of the selected suggestion into a document fragment translation region. For example, as shown in FIG. 4H, the translator may select the prior human translation 428 which, in turn, can be automatically added to the document fragment translation region 434.

Figure 4I:
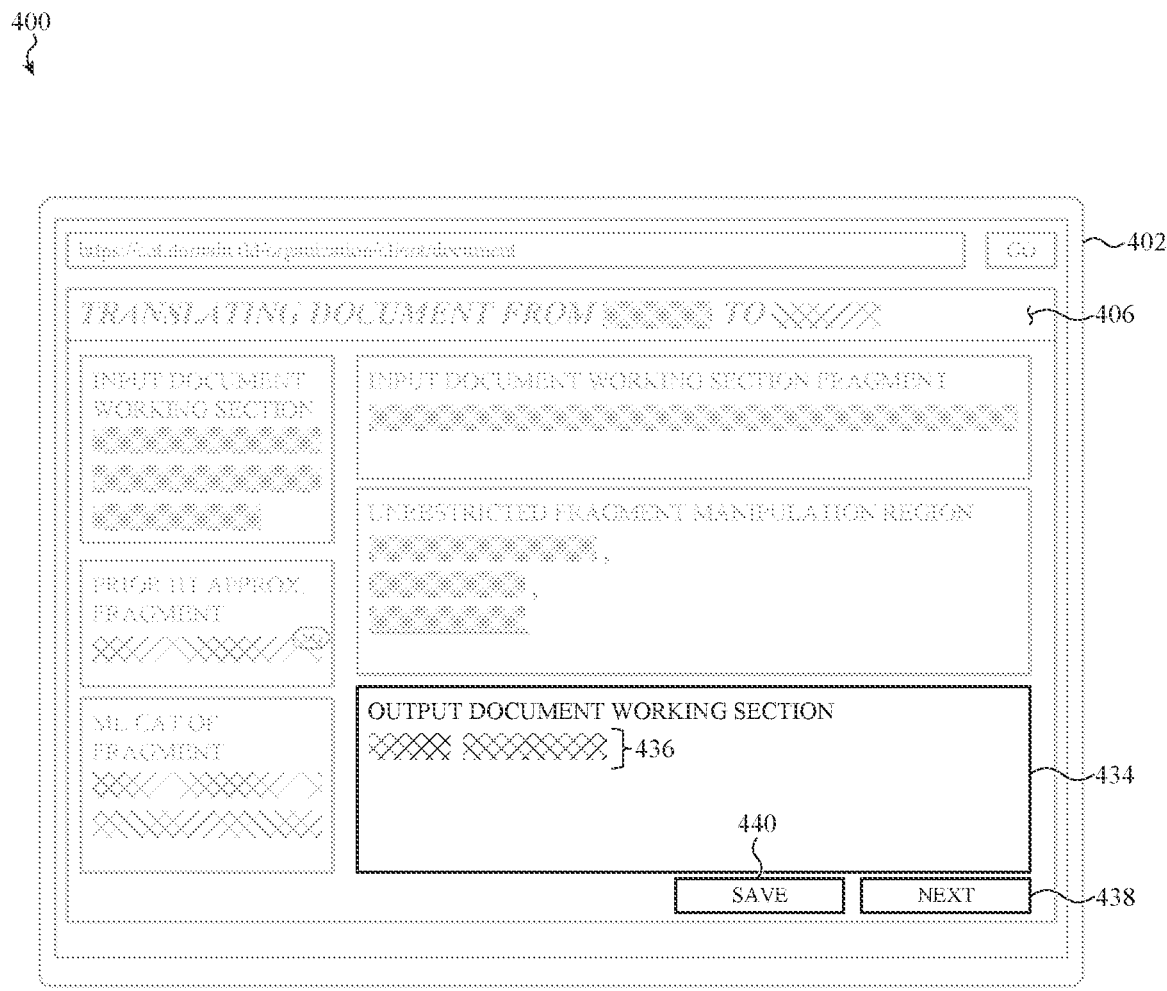

In some cases, such as shown in FIG. 4I, the translator may desire to further edit a copied suggestion or set of copied suggestions (whether ML, HT, or hybrid suggestions). More specifically, like the unrestricted editing region 414 (see, e.g., FIG. 4G), the document fragment translation region 434 can be used by the translator to finalize a translation of the document fragment. Once the translator is satisfied that the original, unedited, version of the document fragment shown in the document fragment view region 412 is suitably translated as the output document fragment 436, the translator can advance to another document fragment (e.g., by selecting a suitable affordance, such as the button 438) and/or may indicate to the system to save the document in its current state (e.g., by selecting a suitable affordance, such as the button 440).

These foregoing embodiments depicted in FIGS. 3-4 and the various alternatives thereof and variations thereto are presented, generally, for purposes of explanation, and to facilitate an understanding of various configurations and constructions of a system and how such a system may interact with a graphical user interface, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, it may be appreciated that in some embodiments, ML suggestions may be displayed alongside and/or intermingled within HT suggestions and hybrid suggestions.

In some examples, an unrestricted editing region may be partially restricted. For example, a translator may be permitted to change word order, insert punctuation, or insert newlines while other actions are prevented. In other cases, a translator's seniority and/or role in an organization may inform a restriction(s) placed on that translator. In other cases, a translator may be able to select between a limited set of synonyms, but may not be able to replace a word entirely.

Figure 5:
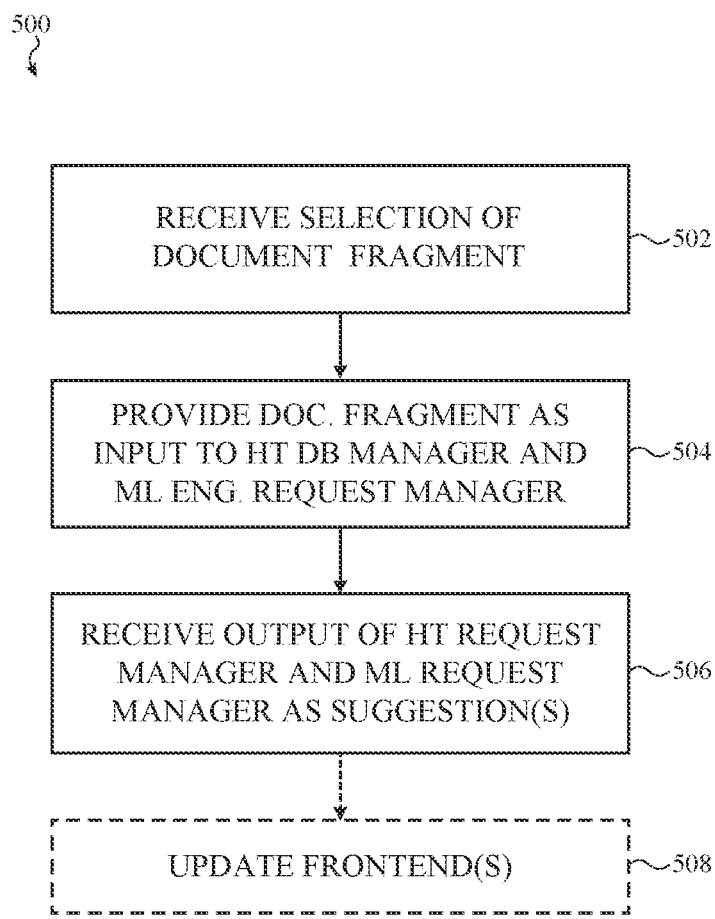
FIG. 5 is a flowchart depicting example operations of a method of providing a graphical user interface for computer-aided translation, as described herein.

FIG. 5 is a flowchart depicting example operations of a method of providing a graphical user interface for computer-aided translation, as described herein. The method 500 can be performed by a frontend or a backend of a system as described herein.

The method 500 includes operation 502 at which selection of a particular working document fragment is received. This input may be provided by a translator to a graphical user interface as described herein.

The method 500 further includes operation 504 at which a selected document fragment is provided as input to an HT database manager and/or to an ML engine request manager, such as described above with reference to FIGS. 1-3.

The method 500 further includes operation 506 at which one or more suggestions are received from the HT database manager(s) and/or the ML engine request manager(s). More specifically, one or more HT suggestions, ML suggestions, and or hybrid suggestions may be received. Thereafter, optionally, at operation 508 an instruction may be provided to display one or more of the suggestions in a graphical user interface.

Figure 6:
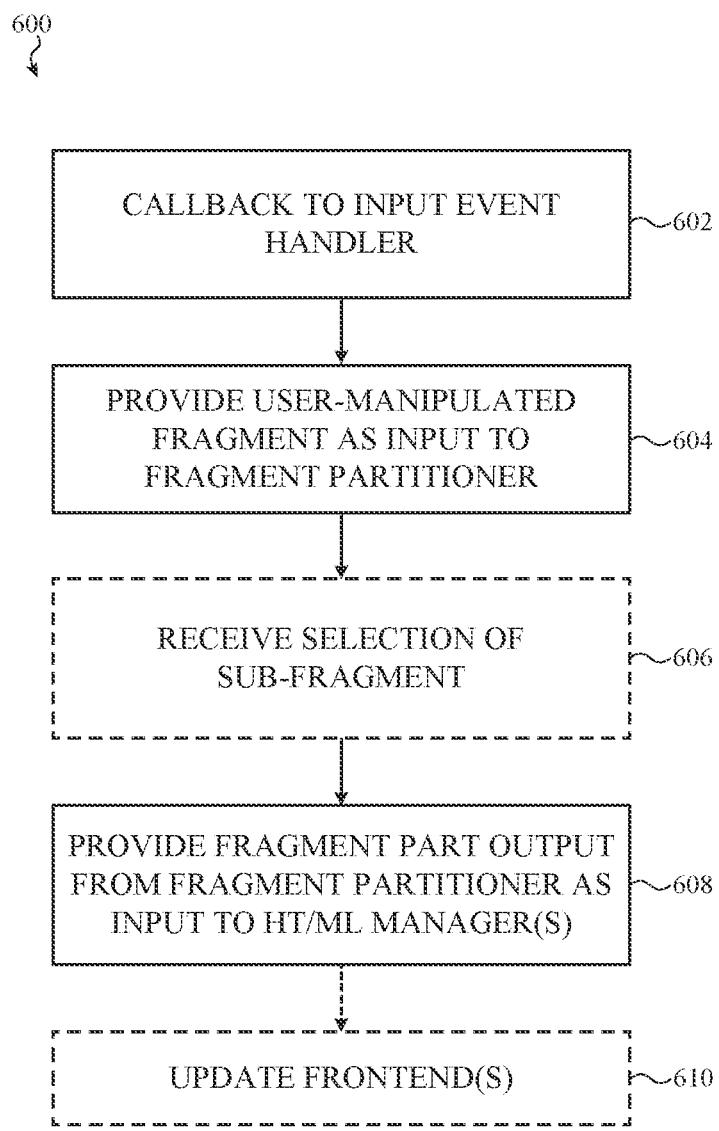
FIG. 6 is a flowchart depicting example operations of a method of providing a graphical user interface for computer-aided translation, as described herein.

FIG. 6 is a flowchart depicting example operations of a method of providing a graphical user interface for computer-aided translation, as described herein. As with other embodiments described herein, the method 600 can be performed by a frontend or a backend.

The method 600 includes operation 602 at which an input event is received at a user input element. In many cases, an input event callback function may be called, and may receive as input text edited by a user of the graphical user interface containing the user input element. Next, at operation 604, the user-manipulated document fragment may be provided as input to a fragment partitioner. For example, the fragment partitioner may break the string by newline characters, punctuation characters, or any other suitable character. For example, in some cases, phrases enclosed in parentheses may be separated as individual document fragments.

The method 600 further includes operation 606 at which, optionally, the system can receive as input a selection of a sub-fragment provided as output from the fragment partitioner. The selection may be provided by a translator operating a graphical user interface as described herein.

The method 600 includes operation 608 at which the selected sub-fragment is provided as input to an HT database manager and/or to an ML engine request manager, such as described above with reference to FIGS. 1-3.

The method 600 further includes operation 610 at which one or more suggestions are received from the HT database manager(s) and/or the ML engine request manager(s) and a frontend may be (optionally) updated.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed and aggregated only for legitimate, agreed-upon, and reasonable uses.

What is claimed is:

1. A system for computer-aided translation of an original electronic document from a first language to a second language, the system comprising:
a client device comprising:
a memory storing executable instructions; and
a processor operably coupled to the memory and configured to load the executable instructions form the memory to instantiate an instance of a frontend application configured to communicably couple to a backend application instance instantiated by cloud infrastructure, the frontend application configured to:
render a graphical user interface comprising:
a first region rendering a section of the original electronic document, the section including a fragment comprising text in the first language;
a second region rendering the fragment independent of the section and the original electronic document;
a third region rendering the fragment independent of the section and the original electronic document, the third region editable in the first language by a translator operating the client device;

a fourth region comprising a first list of previously-captured human translation strings from the first language to the second language, the first list selected at least in part based on content of the third region and automatically updated in response to changes in the first language, by the translator, to content of the third region;

a fifth region comprising a second list of machine translation strings from the first language to the second language, the second list provided at least in part based on content of the third region and automatically updated in response to changes in the first language, by the translator, to content of the third region; and a sixth region comprising text in the second language translating the fragment from the first language to the second language, the sixth region editable in the second language by the translator, wherein content of the sixth region is automatically updated in response to the translator selecting an item from the first list or the second list.

2. The system of claim 1, wherein the client device is a desktop computer or laptop computer.

3. The system of claim 1, wherein the frontend application is a browser application and the frontend application is configured to communicably couple with the backend application instance over a computer network.

4. The system of claim 1, wherein:
the first region comprises an image representation of the original electronic document; and
the second region comprises a text representation of the fragment.

5. The system of claim 1, wherein editing by the translator of content of the third region is restricted to a limited set of editing operations.

6. The system of claim 5, wherein the limited set of editing operations comprises inserting punctuation.

7. The system of claim 5, wherein the limited set of editing operations comprises inserting whitespace.

8. The system of claim 1, wherein the fragment is selected by splitting the original electronic document by a delimiter.

9. The system of claim 8, wherein the delimiter separates document sections of the original electronic document.

10. The system of claim 8, wherein the delimiter separates sentences of the original electronic document.

11. A client device for computer-aided translation of an original electronic document from a first language to a second language, the client device comprising:
a memory storing executable instructions; and
a processor operably coupled to the memory and configured to load the executable instructions form the memory to instantiate an instance of a frontend application configured to communicably couple to a backend application instance instantiated by cloud infrastructure, the frontend application configured to:
render a graphical user interface comprising:
a reference region rendering a fragment of the original electronic document, the reference region not editable by a translator operating the client device;
an unrestricted editing region rendering the fragment, the unrestricted editing region editable in the first language by the translator;

a human translation suggestion region comprising a first list of previously-captured human translation strings updated automatically in response to changes to content of the unrestricted editing region;

a machine translation suggestion region comprising a second list of machine translation strings updated automatically in response to changes to content of the unrestricted editing region;

a working region comprising text in the second language, the working region editable in the second language by the translator, and in which content of the working region is automatically updated in response to the translator selecting an item from the first list or the second list.

12. The client device of claim 11, wherein the client device is configured to:
generate a request to the backend application instance in response to the translator changing content of the unrestricted editing region, the request comprising content of the unrestricted editing region; and
receive a response from the backend application instance, the response comprising an update to at least one of the first list or the second list.

13. The client device of claim 11, wherein the client device is configured to:
generate a request to the backend application instance in response to the translator selecting a sub-fragment of content within the unrestricted editing region, the request comprising the sub-fragment; and
receive a response from the backend application instance, the response comprising an update to at least one of the first list or the second list.

14. The client device of claim 11, wherein the first list is sorted by relevance in respect of content of the unrestricted editing region.

15. The client device of claim 11, wherein the second list is sored by a confidence metric provided by a machine translation engine.

16. The client device of claim 15, wherein the confidence metric is rendered within the machine translation suggestion region.

17. A method of rendering a graphical user interface over a display of a client device operating an instance of a frontend application of a computer aided translation system, the method comprising:
receiving a selection of an input document;
determining an original language of the input document;
receiving an indication of a target language for translation;
delimiting text of the input document into segments;
rendering, in a first region of the graphical user interface, a first segment;
rendering, in a second region of the graphical user interface, a fragment of the first segment, the second region immutable by a translator operating the client device;
rendering, in a third region of the graphical user interface, the fragment, the third region mutable by the translator;
in response to a change made by the translator to content of the third region:
based on content of the third region, generating a request to a backend application instance associated with the computer-aided translation system;
receiving in response to the request a list of previously-provided human translation strings from the original language to the target language, each item of the list corresponding at least in part to a sub-fragment of the content of the third region;

rendering, in a fourth region of the graphical user interface, the list; and providing, in a fifth region of the graphical user interface, an editable text region for the translator to input, in the target language, a translation of the content of the second region, wherein in response to the translator selecting an item from the list, automatically updating content of the fifth region with content the selected item.

18. The method of claim 17, wherein the first and second lists are updated in response to each change to the third region.

19. The method of claim 17, wherein:

the list is a first list;

the response comprises a second list of machine translation strings from the original language to the target language, each item of the second list corresponding at least in part to a sub-fragment of the content of the third region; and the method comprises:

rendering, in a sixth region of the graphical user interface, the second list.

20. The method of claim 19, wherein the fifth region is automatically updated in response to a selection by the translator of an item of the second list.

* * * * *